United States Patent
Iwasawa et al.

(10) Patent No.: US 9,268,146 B2
(45) Date of Patent: Feb. 23, 2016

(54) USER INTERFACE WITH A COMPOSITE IMAGE THAT FLOATS

(75) Inventors: Masaru Iwasawa, Tokyo (JP);
Kazuhiko Mizuno, Tokyo (JP); Robert L. W. Smithson, Mahtomedi, MN (US);
Richard L. Rylander, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 13/255,532

(22) PCT Filed: Mar. 9, 2010

(86) PCT No.: PCT/US2010/026621
§ 371 (c)(1),
(2), (4) Date: Sep. 9, 2011

(87) PCT Pub. No.: WO2010/104827
PCT Pub. Date: Sep. 16, 2010

(65) Prior Publication Data
US 2012/0002292 A1    Jan. 5, 2012

Related U.S. Application Data

(60) Provisional application No. 61/158,827, filed on Mar. 10, 2009.

(51) Int. Cl.
*G02B 27/10*       (2006.01)
*G02B 27/22*       (2006.01)
(Continued)

(52) U.S. Cl.
CPC ............ *G02B 27/2214* (2013.01); *G01J 5/20* (2013.01); *G02B 13/14* (2013.01); *G02B 27/2292* (2013.01); *G02B 2027/014* (2013.01); *G06F 3/011* (2013.01); *G06F 3/016* (2013.01)

(58) Field of Classification Search
CPC .......... G02B 26/001; G02B 2027/014; G02B 27/2214; G02B 27/2292; G02B 13/14; G02B 3/011; G01D 5/34715; G06F 3/011; G06F 3/016; G01J 5/20; G01J 1/0219
USPC ............ 359/618–630; 345/6, 156; 250/208.1, 250/231.13, 231.18, 338.1–338.5, 250/339.1–339.15
See application file for complete search history.

(56) References Cited

U.S. PATENT DOCUMENTS 3,801,183 A    4/1974 Sevelin
4,621,898 A    11/1986 Cohen
(Continued)

FOREIGN PATENT DOCUMENTS

EP    1909255    4/2008
JP    H08-153940    6/1996
(Continued)

OTHER PUBLICATIONS

PCT International Search Report for PCT/US2010/026621, mailed May 19, 2010.

*Primary Examiner* — Scott J Sugarman
*Assistant Examiner* — Daniele Manikeu
(74) *Attorney, Agent, or Firm* — X. Christina Huang

(57) ABSTRACT

User interface having a sensor and a composite interface that floats. Embodiments of user interfaces described herein are useful, for example, as automobile components (e.g., dashboard components), appliance components (e.g., dishwasher components, stove components, oven components, microwave oven components, clothes washer components, and clothes dyer components), medical equipment, elevator buttons, laboratory equipment (e.g., scales), as well as consumer electronics (e.g., entertainment devices and cell phones), automatic teller machines, and the like.

18 Claims, 11 Drawing Sheets

(51) Int. Cl.
   *G02B 27/01* (2006.01)
   *G06F 3/01* (2006.01)
   *G02B 13/14* (2006.01)
   *G01J 5/20* (2006.01)

(56) References Cited

U.S. PATENT DOCUMENTS

| | | | |
|---|---|---|---|
| 5,204,160 A | 4/1993 | Rouser | |
| 5,371,496 A * | 12/1994 | Tanamachi | 340/870.28 |
| 5,828,488 A | 10/1998 | Ouderkirk | |
| 5,877,895 A | 3/1999 | Shaw | |
| 5,882,774 A | 3/1999 | Jonza | |
| 6,014,164 A * | 1/2000 | Woodgate | G02B 27/0093 348/42 |
| 6,288,842 B1 * | 9/2001 | Florczak et al. | 359/619 |
| 6,377,238 B1 * | 4/2002 | McPheters | 345/156 |
| 6,398,370 B1 | 6/2002 | Chiu | |
| 6,478,432 B1 | 11/2002 | Dyner | |
| 6,531,230 B1 | 3/2003 | Weber | |
| 6,876,495 B2 * | 4/2005 | Street | G02B 27/2214 348/E13.022 |
| 7,054,045 B2 | 5/2006 | McPheters | |
| 7,336,422 B2 | 2/2008 | Dunn | |
| 7,616,332 B2 | 11/2009 | Kenner | |
| 7,800,825 B2 | 9/2010 | Brooks | |
| 7,981,499 B2 * | 7/2011 | Endle et al. | 428/195.1 |
| 7,995,278 B2 | 8/2011 | Endle | |
| 2002/0019625 A1 * | 2/2002 | Azar | 606/9 |
| 2006/0262411 A1 * | 11/2006 | Dunn | B44F 1/10 359/619 |
| 2007/0014020 A1 | 1/2007 | Bourdelais | |
| 2007/0081254 A1 * | 4/2007 | Endle et al. | 359/626 |
| 2007/0284169 A1 * | 12/2007 | Zabiega | 180/90 |
| 2008/0112039 A1 * | 5/2008 | Chui et al. | 359/291 |
| 2009/0034082 A1 * | 2/2009 | Commander et al. | 359/619 |
| 2009/0034083 A1 * | 2/2009 | Li et al. | 359/619 |
| 2010/0182666 A1 | 7/2010 | Herbert | |
| 2010/0316959 A1 | 12/2010 | Gates | |
| 2012/0058305 A1 | 3/2012 | Mazurek | |

FOREIGN PATENT DOCUMENTS

| | | |
|---|---|---|
| JP | 2007-194341 | 8/2007 |
| JP | 2008-153478 | 7/2008 |
| WO | 2007/018111 | 2/2007 |
| WO | 2010/077454 | 7/2010 |

* cited by examiner

USER INTERFACE WITH A COMPOSITE IMAGE THAT FLOATS

CROSS REFERENCE TO RELATED APPLICATIONS

This application is a national stage filing under 35 U.S.C. 371 of PCT/US2010/026621, filed Mar. 9, 2010, which claims priority to U.S. Provisional Application No. 61/158,827, filed Mar. 10, 2009, the disclosures of which are incorporated by reference in their entireties herein.

BACKGROUND

User interfaces are the links between humans and devices used to accomplish tasks. User interfaces may be as simple as a sign or label stating "push" to indicate where to push, for example, to open a door, or may involve hardware integrated with software, changing, for example, visual displays, voice recognition, etc. Activation or selection or the function to be performed may be done in a variety of ways; including physical contact such as touching a button, switch, as well as motion or thermal detection.

Selection of a function and actuation of that function without physical contact can have benefits including: reducing or eliminating damage to the interface from contact, contamination or the interface and user, repetitive stress injury to the user, etc.

User interfaces typically do not have just functional requirements. The interfaces often have aesthetic requirements so that they are visually interesting, visually pleasing or even not visible until the time of use, or visible only by the user. User interface appearance can influence a user's perception of the quality and craftsmanship of the device (e.g., how well the interface blends in with the device).

SUMMARY

In one aspect a first generic embodiment of a user interface described herein comprises:
  a sensor;
  a sheeting, comprising:
    at least one layer of microlenses, the layer having first and second sides;
    a layer of material disposed adjacent the first side of the layer of microlenses;
    an at least partially complete image formed in the material associated with each of a plurality of the microlenses, wherein the image contrasts with the material; and
    a composite image, provided by the individual images, that appears to the unaided eye to be floating at least one of above or below the sheeting (in some embodiments both),
wherein the sensor and the sheeting are arranged such that when a user interacts with the floating composite image, the sensor is activated.

The term "interacts" as used herein means that a user visually perceives the composite image, decides if they wish the function controlled by the sensor to be activated and then requests activation of that function by placing their finger where the composite image is located which is also where the remote sensor detects the presence of the operators finger and activates the function.

In one aspect a second generic embodiment of a user interface described herein comprising:
  a sensor;
  a sheeting, comprising:
    an array of microlenses;
    a material layer adjacent the array of microlenses;
    at least one of a first modified or first donor material in contact with the material layer, wherein the at least one of a first modified or a first donor material forms individual, partially complete images on the material layer associated with each of a plurality of the microlenses, wherein the sheeting exhibits a composite image, provided by the individual images, that appears to the unaided eye to at least one of float above or below the sheeting,
wherein the sensor and the sheeting are arranged such that when a user interacts with the floating composite image, the sensor is activated.

Optionally, user interfaces provide a visually interesting display that may be have a surface color and texture that matches the device surface color and texture when not in use.

Embodiments of user interfaces described herein are useful, for example, as automobile components (e.g., dashboard components), appliance components (e.g., dishwasher components, stove components, oven components, microwave oven components, clothes washer components, and clothes dyer components), medical equipment, elevator buttons, laboratory equipment (e.g., scales), as well as consumer electronics (e.g., entertainment devices and cell phones), automatic teller machines, and the like.

DETAILED DESCRIPTION

Figure 1:
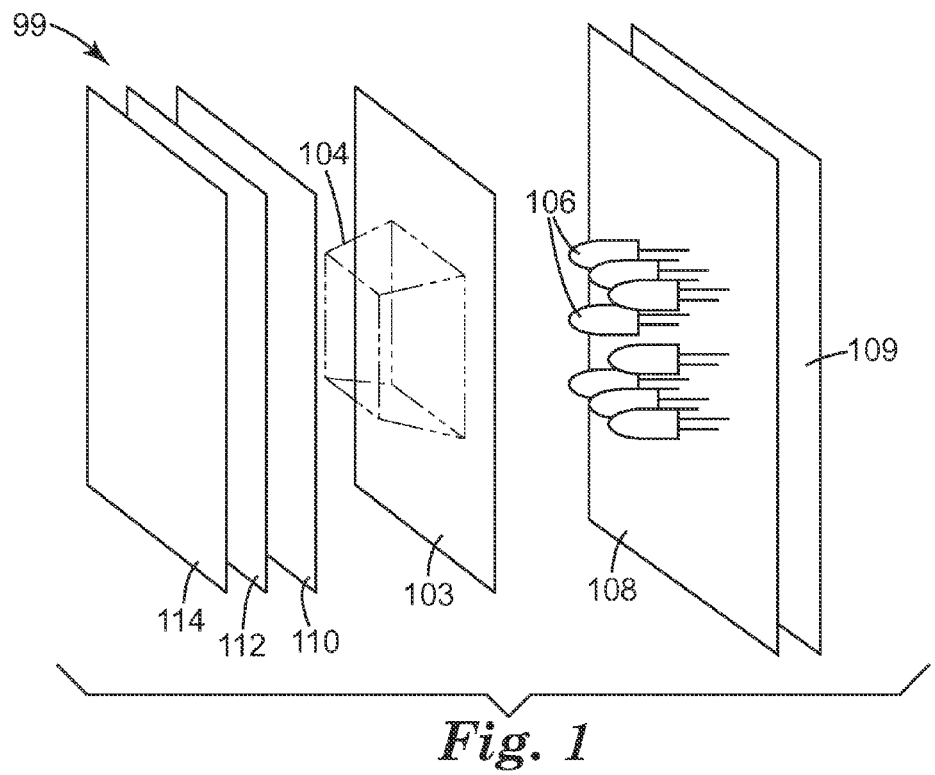
FIG. 1 is a schematic of one exemplary embodiment of a user interface described herein.

Optionally, user interfaces described herein further comprise a partially transmissive reflective film, a tinted film, a color shifting film, hair line film, and/or a light control film.

For example, optional user interfaces described herein may further comprise a partially transmissive reflective film, wherein the sensor, the sheeting, and the partially transmissive reflective film are positioned sequentially in said order.

For example, optional user interfaces described herein may further comprise a tinted film wherein the sensor, the sheeting, and the tinted film are positioned sequentially in said order.

For example, optional user interfaces described herein may further comprise a color shifting film wherein the sensor, the sheeting, and the color shifting film are positioned sequentially in said order.

For example, optional user interfaces described herein may further comprise a light control film wherein the sensor, the sheeting, and the light control film are positioned sequentially in said order.

For example, optional user interfaces described herein may further comprise a partially transmissive reflective film and tinted film wherein the sensor, the sheeting, the partially transmissive reflective film, and the tinted film are positioned sequentially in said order.

For example, optional user interfaces described herein may further comprise a partially transmissive reflective film and tinted film wherein the sensor, the sheeting, the tinted film, and the partially transmissive reflective film are positioned sequentially in said order.

For example, optional user interfaces described herein may further comprise a partially transmissive reflective film and a color shifting film wherein the sensor, the sheeting, the partially transmissive reflective film, and the color shifting film are positioned sequentially in said order.

For example, optional user interfaces described herein may further comprise a partially transmissive reflective film and a color shifting film wherein the sensor, the sheeting, the color shifting film, and the partially transmissive reflective film are positioned sequentially in said order.

For example, optional user interfaces described herein may further comprise a partially transmissive reflective film and a light control film wherein the sensor, the sheeting, the partially transmissive reflective film, and the light control film are positioned sequentially in said order.

For example, optional user interfaces described herein may further comprise a partially transmissive reflective film and a light control film wherein the sensor, the sheeting, the light control film, and the partially transmissive reflective film are positioned sequentially in said order.

For example, optional user interfaces described herein may further comprise a tinted film and a color shifting film wherein the sensor, the sheeting, the tinted film and the color shifting film are positioned sequentially in said order.

For example, optional user interfaces described herein may further comprise a tinted film and a color shifting film wherein the sensor, the sheeting, the color shifting film and the tinted film are positioned sequentially in said order.

For example, optional user interfaces described herein may further comprise a tinted film and a light control film wherein the sensor, the sheeting, the tinted film, and the light control film are positioned sequentially in said order.

For example, optional user interfaces described herein may further comprise a tinted film and a light control film wherein the sensor, the sheeting, the light control film, and the tinted film are positioned sequentially in said order.

For example, optional user interfaces described herein may further comprise a partially transmissive reflective film, a tinted film, and a color shifting film wherein the sensor, the sheeting, the partially transmissive reflective film, tinted film, and the color shifting film are positioned sequentially in any permutation, including sequentially in said order.

For example, optional user interfaces described herein may further comprise a partially transmissive reflective film, a color shifting film, and a light control film wherein the sensor, the sheeting, the partially transmissive reflective film, the color shifting film, and the light control film are positioned sequentially in any permutation, including sequentially in said order.

For example, optional user interfaces described herein may further comprise a partially transmissive reflective film, a tinted film, a color shifting film, and a light control film wherein the sensor, the sheeting, the partially transmissive reflective film, the tinted film, the color shifting film, and the light control film are positioned sequentially in any permutation, including sequentially in said order.

For example, optional user interfaces described herein may further comprise a partially transmissive reflective film, wherein, the sensor, the partially transmissive reflective film and the sheeting are positioned sequentially in said order.

For example, optional user interfaces described herein may further comprise a tinted film wherein the sensor, the tinted film, and the sheeting are positioned sequentially in said order.

For example, optional user interfaces described herein may further comprise a color shifting film wherein the sensor, the color shifting film, and the sheeting are positioned sequentially in said order.

For example, optional user interfaces described herein may further comprise a light control film wherein the sensor, the light control film, and the sheeting are positioned sequentially in said order.

For example, optional user interfaces described herein may further comprise a partially transmissive reflective film and tinted film wherein the sensor, the partially transmissive reflective film, the tinted film, and the sheeting are positioned sequentially in said order.

For example, optional user interfaces described herein may further comprise a partially transmissive reflective film and tinted film wherein the sensor, the tinted film, the partially transmissive reflective film, and the sheeting are positioned sequentially in said order.

For example, optional user interfaces described herein may further comprise a partially transmissive reflective film and a color shifting film wherein the sensor, the partially transmissive reflective film, the color shifting film, and the sheeting are positioned sequentially in said order.

For example, optional user interfaces described herein may further comprise a partially transmissive reflective film and a color shifting film wherein the sensor, the color shifting film, the partially transmissive reflective film, and the sheeting are positioned sequentially in said order.

For example, optional user interfaces described herein may further comprise a partially transmissive reflective film and a light control film wherein the sensor, the partially transmissive reflective film, the light control film, and the sheeting are positioned sequentially in said order.

For example, optional user interfaces described herein may further comprise a partially transmissive reflective film and a light control film wherein the sensor, the light control film, the partially transmissive reflective film, and the sheeting are positioned sequentially in said order.

For example, optional user interfaces described herein may further comprise a tinted film and a color shifting film wherein the sensor, the tinted film, the color shifting film and the sheeting are positioned sequentially in said order.

For example, optional user interfaces described herein may further comprise a tinted film and a color shifting film wherein the sensor, the color shifting film, the tinted film and the sheeting are positioned sequentially in said order.

For example, optional user interfaces described herein may further comprise a tinted film and a light control film wherein the sensor, the tinted film, the light control film, and the sheeting are positioned sequentially in said order.

For example, optional user interfaces described herein may further comprise a tinted film and a light control film wherein the sensor, the light control film, the tinted film, and the sheeting are positioned sequentially in said order.

For example, optional user interfaces described herein may further comprise a partially transmissive reflective film, a tinted film, and a color shifting film wherein the sensor, the partially transmissive reflective film, tinted film, the color shifting film and the sheeting are positioned sequentially in any permutation, including sequentially in said order.

For example, optional user interfaces described herein may further comprise a partially transmissive reflective film, a color shifting film, and a light control film wherein the sensor, the partially transmissive reflective film, the color shifting film, the light control film and the sheeting are positioned sequentially in any permutation, including sequentially in said order.

For example, optional user interfaces described herein may further comprise a partially transmissive reflective film, a tinted film, a color shifting film, and a light control film wherein the sensor, the partially transmissive reflective film, the tinted film, and the color shifting film, the light control film and the sheeting are positioned sequentially in any permutation, including sequentially in said order.

Optionally, when more than one film is present, the sheeting can be placed in the middle of the film stack. For example, some optional embodiments of user interfaces described herein further comprise a tinted film, wherein the sensor, the tinted film, the sheeting are positioned sequentially in said order.

Optionally, user interfaces described herein provide a visually interesting display that may be have a surface color and texture that matches device surface color and texture when not in use.

Optionally, user interfaces described herein further comprising a switch for activating a device to an on and/or off mode.

Optionally, user interfaces described herein further comprise a light source (e.g., a light emitting diode(s)), wherein the light source, the sensor, and the sheeting are positioned sequentially in that order.

Referring to FIG. 1, exemplary user interface 99 has capacitive sensor 109, sheeting 103, optional partially transmissive reflective film 110, optional tinted film or color shifting film 112, optional light control film 114, optional light emitting diodes 106, and optional circuit board 108 for light emitting diodes 106. The virtual image visible to a user is depicted as 104.

Figure 2:
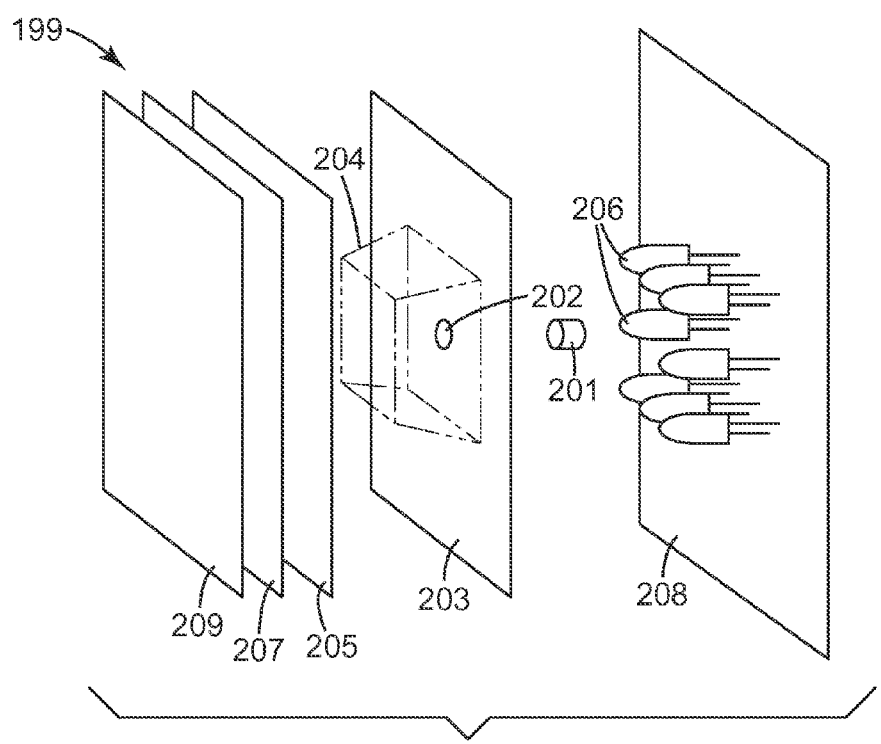
FIG. 2 is a schematic of one exemplary embodiment of a user interface described herein.

Referring to FIG. 2, exemplary user interface 199 has infrared sensor 201, sheeting 203, optional partially transmissive reflective film 205, optional tinted film 207, optional light control film 209, optional light emitting diodes 206, and optional circuit board 208 for light emitting diodes 206, wherein sheeting 203 includes aperture 202 that allows infrared light from infrared sensor 201 to pass and to return through sheeting 203 when activated by the user. The virtual image visible to a user is depicted as 204.

Optionally, for user interfaces described herein, the composite image appears under at least one of reflected or transmitted light to float at least one of above or below (including both) the sheeting. Optionally, for user interfaces described herein, at least part of the composite image at least one of fluoresces or phosphoresces and appears to the unaided eye to float at least one of above or below (including both) the sheeting.

Optionally, for user interfaces described herein, the composite image also appears to the unaided eye to be at least in part in the plane of the sheeting.

Optionally, for user interfaces described herein, the composite image appears to move relative to the sheeting as the viewing position changes relative to the sheeting.

Optionally, for user interfaces described herein, the composite image disappears and reappears when the angle at which the sheeting is viewed changes.

Optionally, for user interfaces described herein, the composite image is perceptible across a viewing angle of less than one hundred fifty degrees (in some cases, less than one hundred twenty-five degrees, or even less than one hundred degrees).

Suitable sensors for user interfaces described herein are known in the art and are commercially available, including infrared sensors and capacitive sensors. For user interfaces described here having an infrared sensor(s), the sheet has infrared light transmission therein (e.g., an opening(s)) to facilitate light transfer through the sheeting to the infrared sensor(s). For user interfaces described here having capacitive sensor(s), the sheet has electrical properties to facilitate detection by the capacitive sensor(s). For example, in some embodiments, the sheeting has electrical resistivity or electrical isolation to facilitate detection by the capacitive sensor(s).

The microlens sheeting used in user interfaces described herein can have a composite image provided by individual partially complete images and/or individual complete images associated with a number of the microlenses, that appears to be suspended, or to float above, in the plane of, and/or below the sheeting. These suspended images are referred to for convenience as floating images, and they can be located above or below the sheeting (either as two or three-dimensional images), or can be a three-dimensional image that appears above, in the plane of, and below the sheeting.

Optionally, the images can be in black and white or in color, and can appear to move with the observer. Unlike some holographic sheetings, the imaged sheeting cannot be used to create a replica of itself. Additionally, the floating image(s) can be observed by a viewer with the unaided eye.

In one embodiment, a single composite image is formed. Embodiments are also disclosed in which two or more composite images are formed, as well as composite images that appear to be above, below, or in the plane of the sheeting. Other embodiments could consist of combinations of conventionally printed images and composite images.

Optionally, for some embodiments of the sheeting used in user interfaces described herein, the material disposed adjacent the layer of microlenses is a radiation sensitive material (e.g., metallic and/or non-metallic (including metallic oxide compounds) radiation sensitive materials). Exemplary metallic radiation sensitive materials include those selected from the group consisting of aluminum, silver, copper, gold, titanium, zinc, tin, chromium, vanadium, tantalum, alloys of these metals, and combinations thereof. Exemplary metallic radiation sensitive materials include those selected from the group consisting of zinc sulfide, zinc selenide, silicon dioxide, indium tin oxide, zinc oxide, magnesium fluoride, silicon, and combinations thereof. Exemplary metallic radiation sensitive materials include those selected from the group consisting aluminum oxide compounds, iron oxide compounds, copper oxide compounds, tin oxide compounds, and chromium oxide compounds.

Optionally, for user interfaces described herein, the material disposed adjacent the layer of microlenses is a thermochromic radiation sensitive material Exemplary thermochromic radiation sensitive material include those selected from the group consisting of copper carbonate, copper nitrate with thiourea, copper carbonate with sulfur containing compounds of thiols, thioethers, sulfoxides, and sulfones, hydrated sulfates, boron nitrides, aluminum nitrides, bismuth nitrides, and combinations thereof.

Optionally, for user interfaces described herein, the material disposed adjacent the layer of microlenses is a multi-layer film radiation sensitive material sufficiently thick to provide the desired visual effect.

Optionally, user interfaces described herein further comprise a spacer layer disposed between the material layer and the microlenses. A spacer layer is typically a clear polymer layer that is applied over the glass beads, and aids in providing a sharper image. Typically, light does not focus on the back surface of a bead, but rather focuses a small distance away from the backside of the bead. Therefore, to provide a sharper image, it is typically desirable for the thickness of the spacer layer to be approximately equal to the distance away from the backside of the bead where the light is focused.

Optionally, in the second generic embodiment of user interfaces described herein, the at least one of a first modified or a first donor material comprises a colorant. Optionally, in the second generic embodiment of user interfaces described herein, the composite image exhibits a color similar to the colorant in the at least one of a first modified or a first donor material.

Optionally, in the second generic embodiment of user interfaces described herein, the at least one of a first modified or a first donor material comprises at least one of a radiation sensitive material, a metallic radiation sensitive material, or a nonmetallic radiation sensitive material.

In some embodiments, the color of the composite image changes relative to a viewing angle of less than one hundred fifty degrees.

Optionally, in the second generic embodiment of user interfaces described, further comprises at least one of a second modified or a second donor material adjacent the material layer, wherein the at least one of a second modified or a second donor material forms individual, partially complete images on the sheeting associated with each of a plurality of the microlenses.

Optionally, in the second generic embodiment of user interfaces described herein, the at least one of a second modified or a second donor material comprises a colorant different from the colorant of the at least one of a first modified or a first donor material.

Optionally, in the second generic embodiment of user interfaces described herein, at least a portion of the composite image exhibits colors similar to the colorants in the at least one of a first modified or a first donor material and the at least one of a second modified or a second donor material.

Optionally, in the second generic embodiment of user interfaces described herein, at least a portion of the composite image exhibits a color similar to a mixture of the colorants in the at least one of a first modified or a first donor material and the at least one of a second modified or a second donor material.

Optionally, in the second generic embodiment of user interfaces described herein, the at least one of a first modified or a first donor material comprises a colorant and provides a first composite image, and the at least one of a second modified or a second donor material provides a second composite image that is at least one of fluoresces or phosphoresces.

Figure 3:
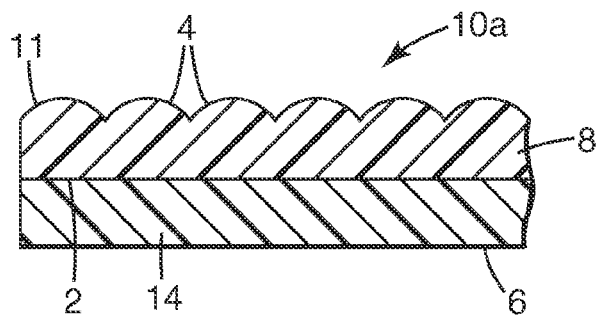
FIG. 3 is an enlarged cross sectional view of a microlens sheeting comprising a plano-convex base sheet.
Figure 4:
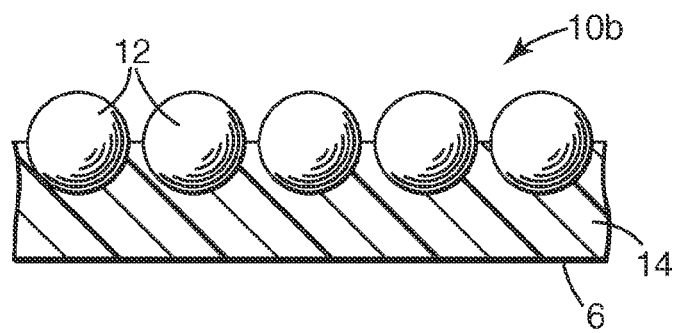
FIG. 4 is an enlarged cross sectional view of an "exposed lens" microlens sheeting.

Microlens sheeting in which the images can be formed can be comprised of one or more discrete layers of microlenses with a layer of material adjacent to one side of the microlens layer or layers. For example, FIG. 3 illustrates one exemplary embodiment of a suitable type of microlens sheeting 10a. Sheeting 10a comprises transparent base sheet 8 having first and second broad faces, wherein second face 2 is substantially planar and first face 11 has an array of substantially spherical or aspherical microlenses 4. Layer of material 14 is optionally provided on second face 2 of base sheet 8. Layer of material 14 includes a first side 6 for receiving donor material as described in more detail below. FIG. 4 illustrates another exemplary embodiment of a suitable type of microlens sheeting 10b. The shape of the microlenses and thickness of the base sheet and their variability are selected such that light appropriate for viewing the sheeting is focused approximately at first face 6. In this embodiment, the microlens sheeting is an "exposed lens" type of microlens sheeting 10b that includes a monolayer of transparent microspheres 12 that are partially embedded in material layer 14, which is also typically a bead binder layer, such as a polymeric material. Microspheres 12 are transparent both to the wavelengths of radiation that may be used to image the donor substrate material (explained in more detail below), as well as to the wavelengths of light in which the composite image will be viewed. This type of sheeting is described in greater detail in U.S. Pat. No. 3,801,183 (Sevelin et al.), except where the bead bond layer is very thin, for instance, to the extent where the bead bond layer is only between the beads, or occupying the interstitial spaces between the beads. Alternatively, this type of sheeting can be made by using microspheres of an appropriate optical index for focusing radiation approximately on first side 6 of the layer of material 14 when the bead bond is of the thickness taught in U.S. Pat. No. 3,801,183 (Sevelin et al). Such microspheres include polymethyl methylacrylate beads, which are commercially available, for example, from Esprix Technologies, Sarasota, Fla.

Figure 5:
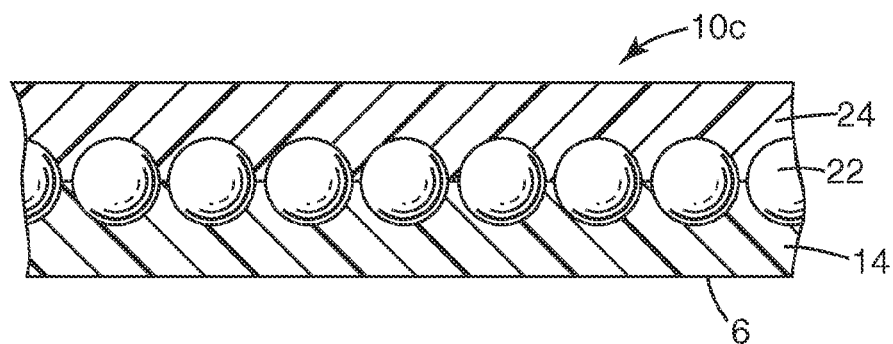
FIG. 5 is an enlarged cross sectional view of an "embedded lens" microlens sheeting.

FIG. 5 illustrates another exemplary embodiment of a suitable type of microlens sheeting 10c. In this embodiment, the microlens sheeting is an "embedded-lens" type of sheeting 10c in which microsphere lenses 22 are embedded between a transparent protective overcoat 24, which is typically a polymeric material, and material layer 14, which is also typically a bead binder layer, such as a polymeric material. Layer of material 14 includes first side 6 for receiving donor material as described in more detail below. This type of sheeting is described in greater detail in U.S. Pat. No. 3,801,183 (Sevelin et al), except that the reflective layer and adhesive would be removed, and layer 14 is reformulated so as to be less conformal to the curvature of the microspheres.

The microlenses of sheeting 10 preferably have image forming refractive elements in order for image formation (described in more detail below) to occur; this is generally provided by forming spherically or aspherically shaped features. Other useful materials that provide a gradient refractive index (GRIN) will not necessarily need a curved surface to refract light. The microlenses may have any symmetry, such as cylindrical or spherical, provided real images are formed by the refraction surfaces. The microlenses themselves can be of discrete form, such as round plano-convex lenslets, round double convex lenslets, Fresnel lenslets, diffractive lenslets, rods, microspheres, beads, or cylindrical lenslets. Materials from which the microlenses can be formed include glass, polymers, minerals, crystals, semiconductors and combinations of these and other materials. Non-discrete microlens elements may also be used. Thus, microlenses formed from a replication or embossing process (where the surface of the sheeting is altered in shape to produce a repetitive profile with imaging characteristics) can also be used.

Microlenses with a uniform refractive index in a range from 1.4 to 3.0 over the visible and infrared wavelengths are preferred and more preferably, in a range from 1.4 to 2.5, although not required. The refractive power of the microlenses, whether the individual microlenses are discrete or replicated, and regardless of the material from which the microlenses are made, is preferably such that the light incident upon the optical elements will focus on or near first side 6 of material layer 14. In certain embodiments, the microlenses preferably form a demagnified real image at the appropriate position on that layer. The construction of the microlens sheeting provides the necessary focusing conditions so that energy incident upon the front surface of the microlens sheeting is approximately focused upon a separate modified and/or donor layer that is preferably radiation sensitive, which is described in more detail below.

Microlenses with diameters ranging from 15 micrometers to 275 micrometers are preferable, though other sized microlenses may be used. Good composite image resolution can be obtained by using microlenses having diameters in the smaller end of the aforementioned range for composite images that are to appear to be spaced apart from the microlens layer by a relatively short distance, and by using larger microlenses for composite images that are to appear to be spaced apart from the microlens layer by larger distances. Other microlenses, such as plano-convex, spherical or aspherical microlenses having lenslet dimensions comparable to those indicated for the microlenses, can be expected to produce similar optical results. Cylindrical lenses having lenslet dimensions comparable to those indicated for the microlenses can be expected to produce similar optical results, although different or alternative imaging optics train may be required.

As noted above, layer of material 14 in FIGS. 3-5 may be provided adjacent to the microlenses in microlens sheeting 10. Suitable materials for material layer 14 in sheeting 10 include silicone, polyester, polyurethane, polycarbonate, polypropylene, or any other polymer capable of being made into sheeting or being supported by base sheet 8. In one exemplary embodiment, sheeting 10 may include a microlens layer and a material layer that are made from different materials. For example, the microlens layer may include acrylates, and the material layer may include polyester. In other exemplary embodiments, sheeting 10 may include a microlens layer and a material layer that are made from the same materials. For example, the microlens and material layer of sheeting 10 may be made of silicone, polyester, polyurethane, polycarbonate, polypropylene, or any other polymer capable of being made into sheeting, and may be formed by methods of mechanical embossing, replication or molding.

In the first generic embodiment of user interfaces described herein the floating images on microlens sheeting can be created as a result of a compositional change, a removal or ablation of the material, a phase change, or a polymerization of the coating disposed adjacent to one side of the microlens layer or layers. In addition to the details provided herein, also see U.S. Pat. No. 6,288,842 (Florczak et al.), the disclosure of which is incorporated herein by reference.

Further, for the second generic embodiment of user interfaces described herein the methods for creating floating images on microlens sheeting further comprise the addition of material on the microlens sheeting. In addition to the details provided herein, also see published U.S. Pat. Appl. No. 2007/0081254 (Endle et al.), the disclosure of which is incorporated herein by reference.

A. Creating a Composite Image that Floats Above the Sheeting

Figure 6:
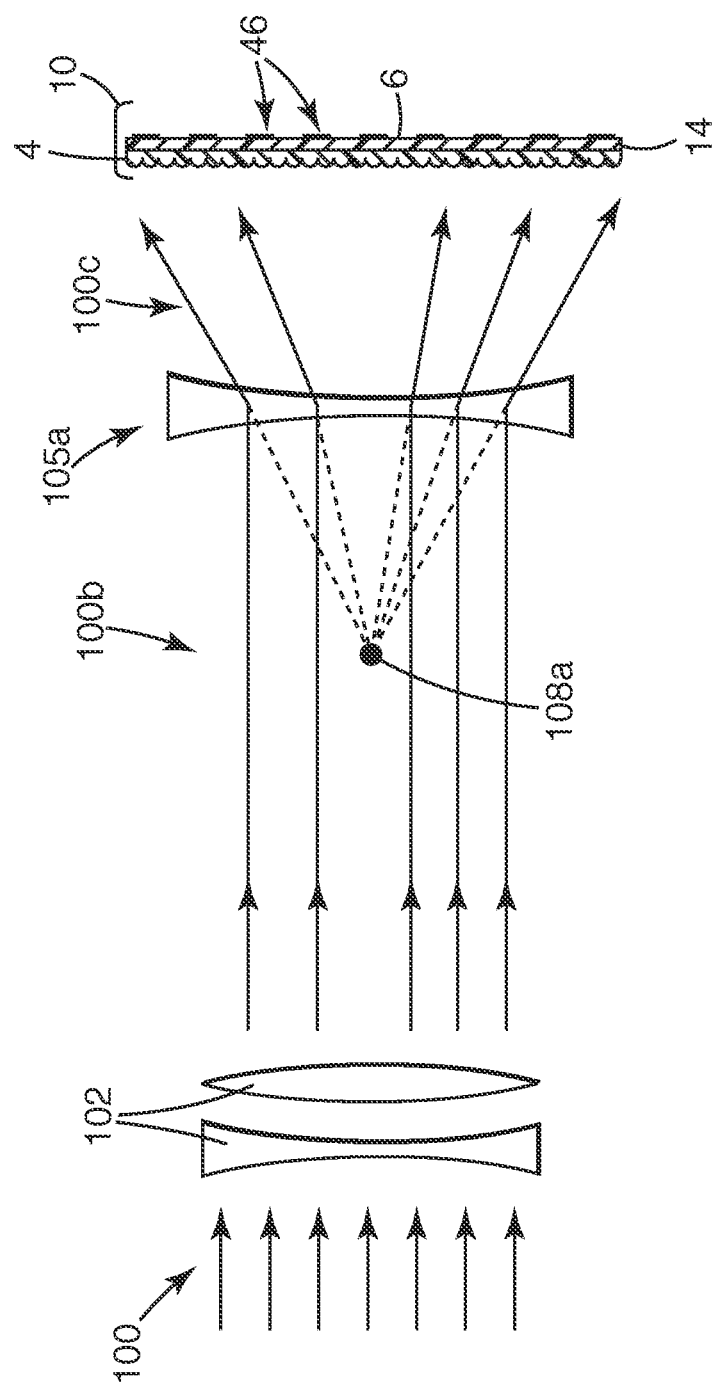
FIG. 6 is an exemplary geometrical optical representation of the formation of a composite image that appears to float above microlens sheeting described herein.

Referring to FIG. 6, incident radiation 100 (light, in this example) is directed and collimated by optics 102 that directs light 100b towards diverging lens 105a. From the diverging lens, light rays 100c diverge toward microlens sheeting 10.

The energy of the light rays impinging upon microlens sheeting 10 is focused by individual microlenses 4 approximately at the interface between material layer 14 and a donor substrate (not shown). This focused radiation results in the modification and/or transfer of at least a portion of the radiation sensitive material and/or the colorant in the modified and/or donor substrate to provide images 46 on surface 6 of material layer 14, the size, shape, and appearance of which depends on the interaction between the light rays, the microlenses, and the radiation sensitive modified and/or donor substrate.

The arrangement shown in FIG. 7 would provide a sheeting having a composite image that appears to an observer to float above the sheeting as described below, because diverging rays 100c, if extended backward through the lens, would intersect at the focal point 108a of the diverging lens. Stated differently, if a hypothetical "image ray" were traced from the material layer through each of the microlenses and back through the diverging lens, they would meet at 108a, which is where a portion of the composite image appears.

B. Viewing a Composite Image that Floats Above the Sheeting

A sheeting that has a composite image may be viewed using light that impinges on the sheeting from the same side as the observer (reflected light), or from the opposite side of the sheeting as the observer (transmitted light), or both. FIG. 7 is a schematic representation of a composite image that appears to the unaided eye of an observer A to float above the sheeting when viewed under reflected light. An unaided eye may be corrected to normal vision, but is not otherwise assisted by, for example, magnification or a special viewer. When the imaged sheeting is illuminated by reflected light, which may be collimated or diffuse, light rays are reflected back from the imaged sheeting in a manner determined by modified and/or donor material 42 in individual images 46 struck by the light rays. By definition, the images formed by modified and/or donor material 42 appear different than the non-imaged portions of material layer 14 where no modified and/or donor material 42 is present, and thus an image can be perceived.

For example, portions (e.g., a specific wavelength range) of the light L1 may be reflected by modified and/or donor material 42 back toward the observer, the summation of which creates a colored composite image that appears to float above the sheeting, a portion of which is shown at 108a. In short, specific portions of the visible electromagnetic spectrum can be reflected from the imaged portions 46 or reflected from a laminate substrate such as a passport (not shown) and absorbed or scattered by imaged portions 46, which means that a portion of a colored composite image will be apparent at 108*a*. However, the modified and/or donor material 42 may not reflect light L2 back toward the observer well, or at all, or it may significantly absorb light reflected from a laminate surface and subsequently transmitted through modified and/ or donor material 42. Thus, the observer may detect the absence of light rays at 108*a*, the summation of which creates a black composite image that appears to float above the sheeting, a portion of which appears at 108*a*. In short, light may be partially reflected from the entire sheeting or highly reflected from a laminate behind the sheeting except imaged portions 46, which means that a relatively dark composite image will be apparent at 108*a*.

It is also possible that imaged material 42 would reflect or partially absorb incident light, and a dark laminate (not shown) placed adjacent to imaged portions 46 would absorb the light to provide the contrast effect required to provide a composite image. The composite image under those circumstances would appear as a relatively bright composite image in comparison to the remainder of the sheeting with laminate (not shown), which would appear relatively dark. Various combinations of these possibilities can be selected as desired.

Figure 8:
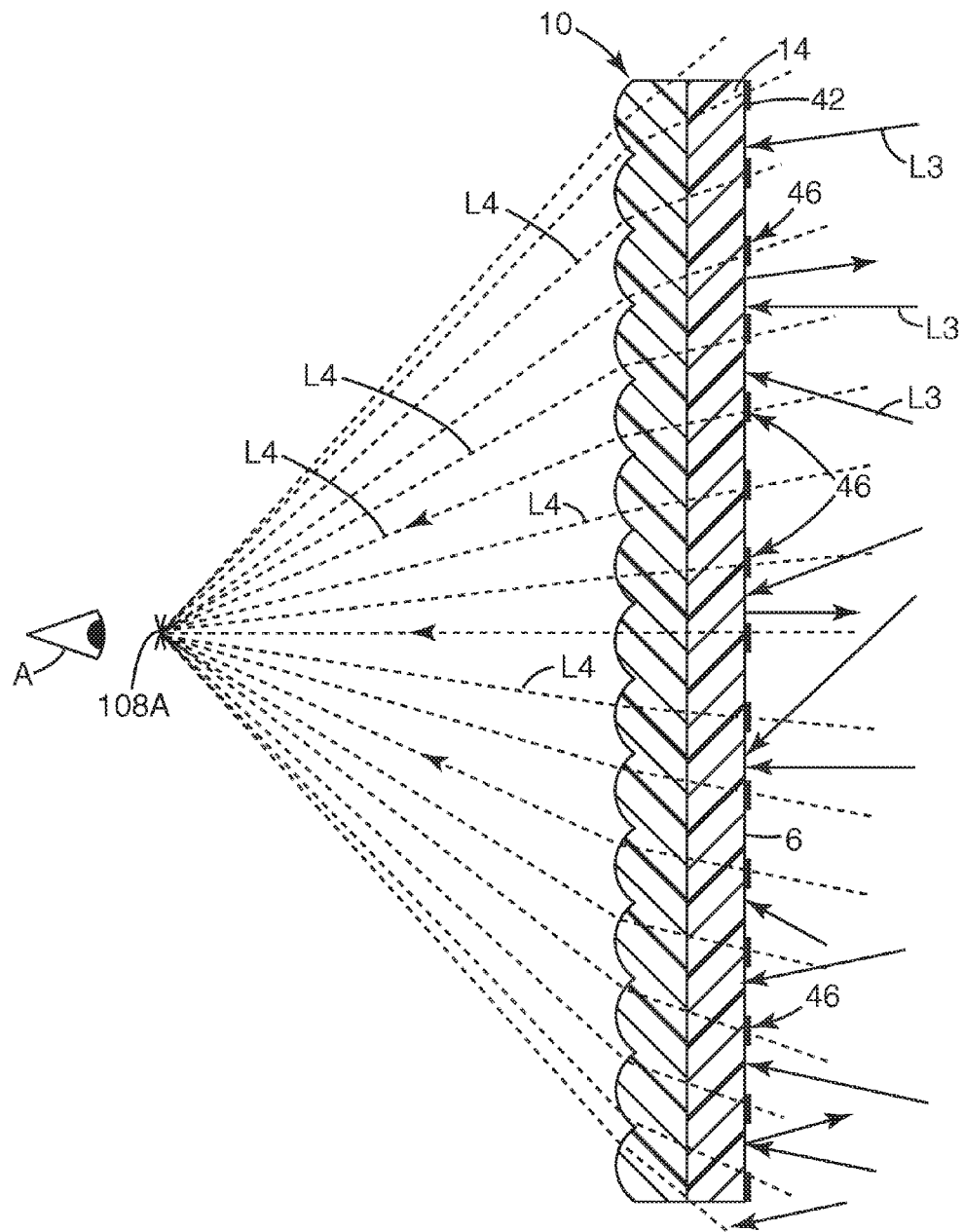
FIG. 8 is a schematic representation of a sheeting having a composite image that appears to float above the sheeting when the sheeting is viewed in transmitted light.

Certain imaged sheetings can also be viewed by transmitted light, as shown in FIG. 8. For example, when the imaged portions of modified and/or donor material 42 on material layer 14 are translucent and absorb portions of the visible spectrum, and the non-imaged portions are transparent or translucent, but highly transmissive, then some light L4 will be selectively absorbed or reflected by modified and/or donor material 42, and not directed by the microlenses toward focal point 108*a*. Other light L3 will be at least partial transmitted from the non-imaged areas. The composite image will be apparent at the focal point, where it will, in this example, appear darker and colored compared to the remainder of the sheeting. In another exemplary embodiment, when the imaged portions of modified and/or donor material 42 on material layer 14 are transparent or translucent, but highly transmissive and the non-imaged portions are translucent and absorb or reflect portions of the visible spectrum, then some light L4 will be directed by the microlenses towards focal point 108*a*. Other light L3 will not be transmitted from the non-imaged areas. The composite image will be apparent at the focal point, where it will, in this example, appear lighter and colored compared to the remainder of the sheeting.

C. Creating a Composite Image that Floats Below the Sheeting

Figure 9:
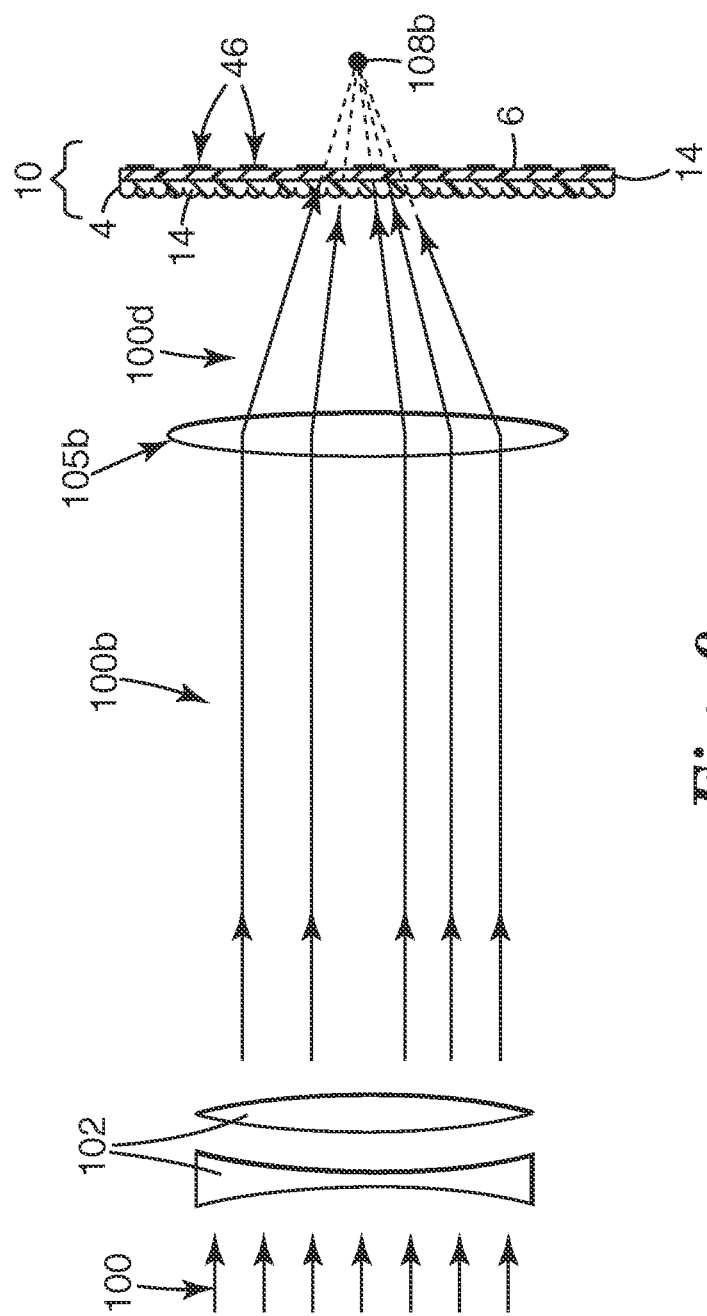
FIG. 9 is a geometrical optical representation of the formation of a composite image that when viewed will appear to float below the microlens sheeting.

A composite image may also be provided that appears to be suspended on the opposite side of the sheeting from the observer. This floating image that floats below the sheeting can be created by using a converging lens instead of the diverging lens 105*a* shown in FIG. 6. Referring to FIG. 9, incident energy 100 (light, in this example) is directed and collimated in collimator 102 that directs light 100*b* toward converging lens 105*b*. From the converging lens, light rays 100*d* are incident on microlens sheeting 10, which is placed between the converging lens and focal point 108*b* of the converging lens.

The energy of the light rays impinging upon microlens sheeting 10 is focused by individual microlenses 4 approximately into the interface area between material layer 14 and a radiation sensitive modified and/or donor substrate (not shown). This focused radiation modifies and/or transfers a portion of the radiation sensitive material in the modified and/or donor substrate to provide images 46 made from modified and/or donor material 42, the size, shape, and appearance of which depends on the interaction between the light rays, the microlens sheeting, and the modified and/or donor substrate. The arrangement shown in FIG. 9 would provide sheeting 10 having a composite image that appears to an observer to float below the sheeting as described below, because converging rays 100*d*, if extended through the sheeting, would intersect at focal point 108*b* of the converging lens. Stated differently, if a hypothetical "image ray" were traced from converging lens 105*b* through each of the microlens and through the images on the material layer formed from modified and/or donor material 42 associated with each microlens, they would meet at 108*b*, which is where a portion of the composite image appears.

D. Viewing a Composite Image that Floats Below the Sheeting

Figure 10:
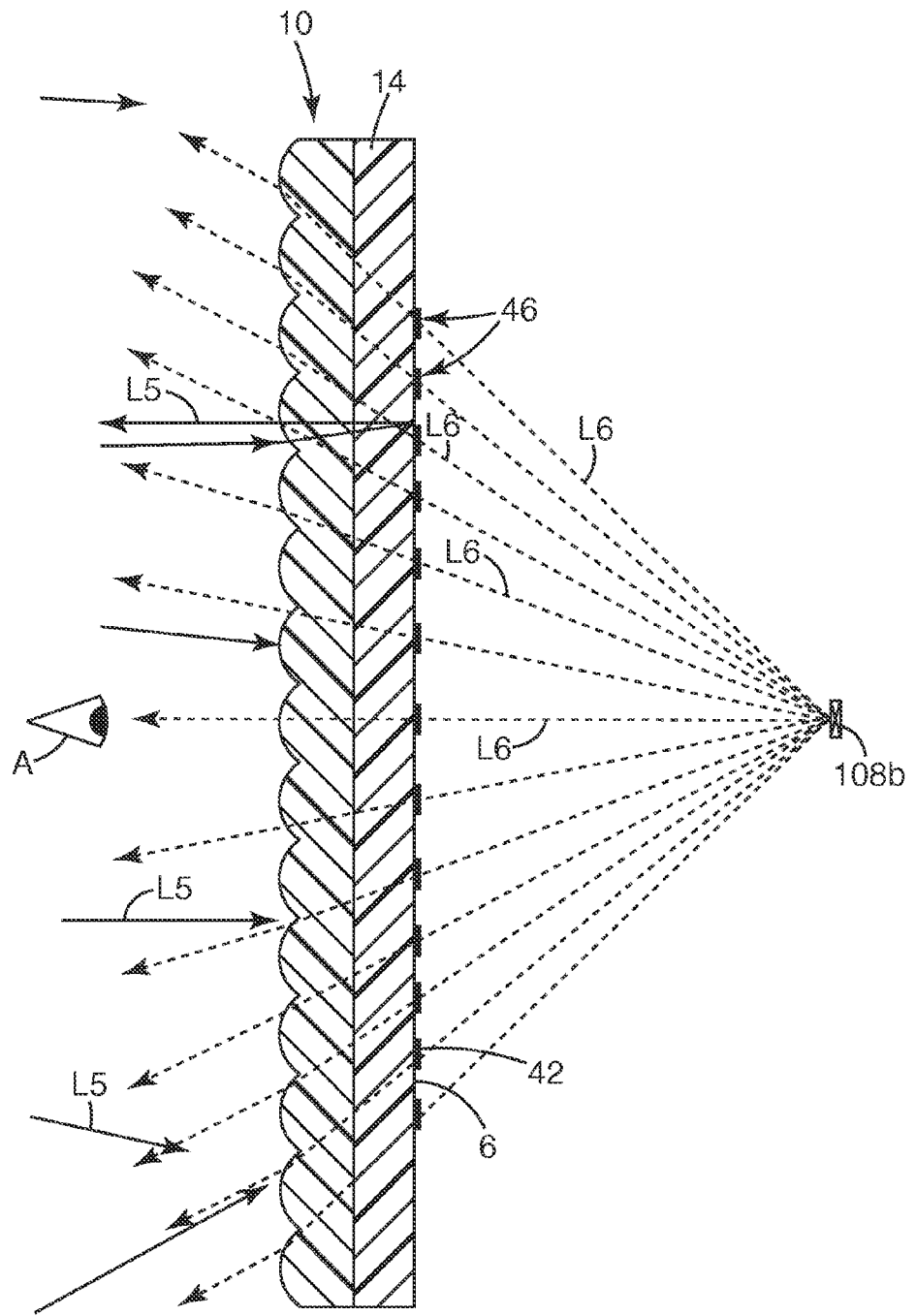
FIG. 10 is a schematic representation of a sheeting having a composite image that appears to float below the sheeting when the sheeting is viewed in reflected light.

Sheeting having a composite image that appears to float below the sheeting can also be viewed in reflected light, transmitted light, or both. FIG. 10 is a schematic representation of a composite image that appears to float below the sheeting when viewed under reflected light. For example, portions of the visible spectrum of light L5 may be absorbed or reflected by modified and/or donor material 42 on material layer 14 back toward the observer. Thus, the observer may detect the presence of colored light rays which appear to originate from 108*b*, the summation of which creates a colored composite image that appears to float below the sheeting, a portion of which appears at 108*b*. In short, light may be reflected primarily from imaged portions 46, which means that a colored composite image will be apparent at 108*b*. Alternatively, the incident light may be reflected by a laminate behind the material layer, portions of which are subsequently absorbed or scattered by modified and/or donor material 42, and travel back toward the observer. Thus, the observer may detect the presence of colored light rays which appear to originate from 108*b*, the summation of which creates a colored composite image. In short, light may be reflected from a laminate behind the material layer and absorbed by imaged portions 46, which means that a colored composite image will be apparent at 108*b*.

It is also possible that the laminate behind the material layer would absorb incident light, and that modified and/or donor material 42 would reflect or partially absorb incident light, respectively, to provide the contrast effect required to provide a composite image. The composite image under those circumstances would appear as a relatively bright composite image in comparison to the remainder of the sheeting, which would appear relatively dark. Various combinations of these possibilities can be selected as desired.

Figure 11:
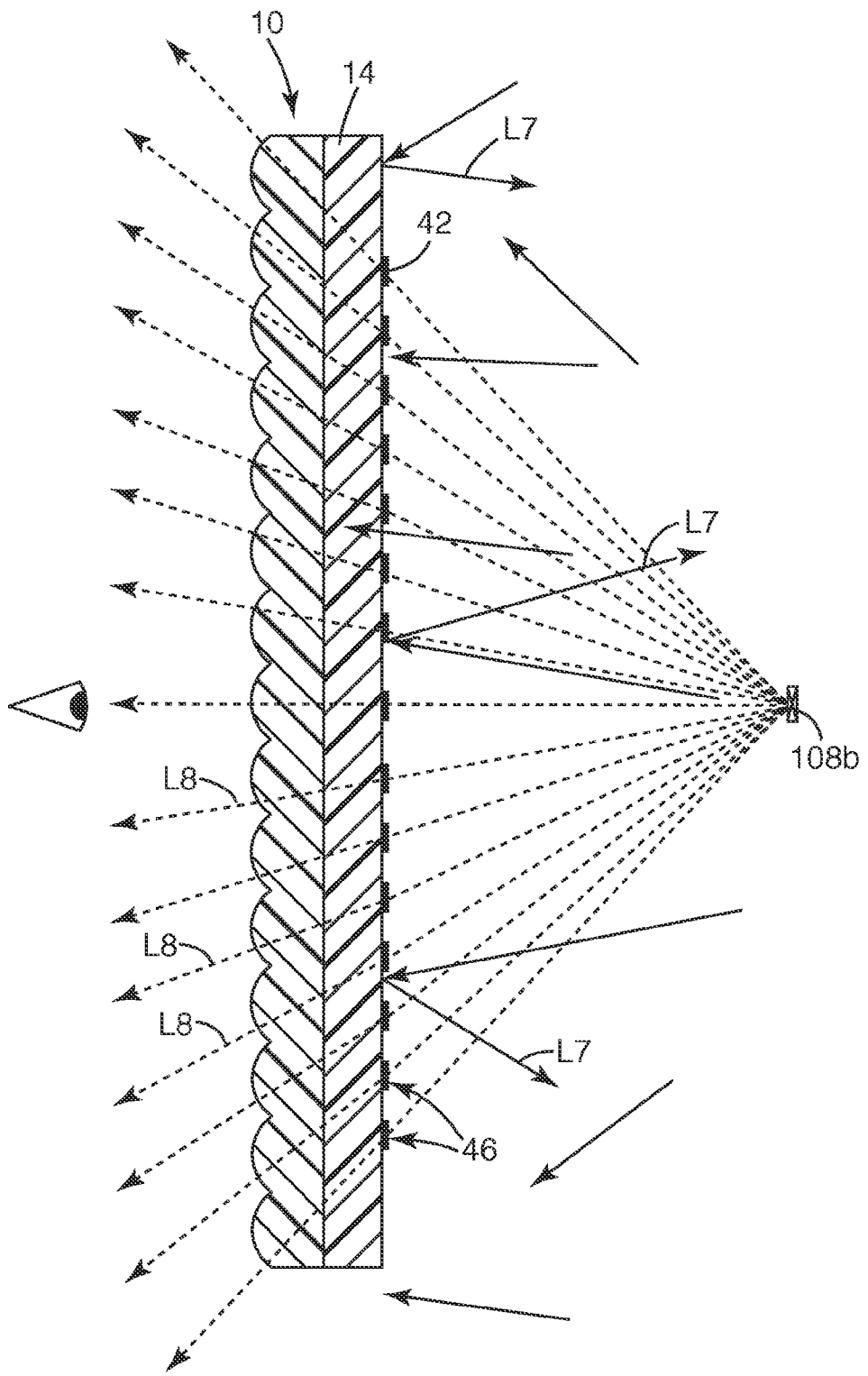
FIG. 11 is a schematic representation of a sheeting having a composite image that appears to float below the sheeting when the sheeting is viewed in transmitted light.

Certain imaged sheetings can also be viewed by transmitted light L7, as shown in FIG. 11. For example, when the imaged portions on material layer 14 of modified and/or donor material 42 are reflecting and/or color absorbing and the non-imaged portions where no modified and/or donor material 42 is present are transparent, then specific portions of the visible spectrum will be reflected or absorbed by modified and/or donor material 42, while transmitted light will be passed through the remaining non-imaged portions. The extension of those absorbed or reflected rays L8, referred to herein as "image rays," back in the direction of the incident light results in the formation of a composite image, a portion of which appears at 108*b*. The composite image will be apparent at the focal point, where, it will, in this example, appear darker and colored compared to the rest of the sheeting.

Alternatively, if the imaged portions of modified and/or donor material 42 on material layer 14 are transparent or translucent but highly transmissive and the non-imaged portions of material layer 14 are reflective or at least partially absorbing, then the transmitted light in the areas of the images will provide "image rays" to form a composite image that appears lighter than the remainder of the sheeting.

Composite images may appear to be either two-dimensional, meaning that they have a length and width, and appear either below, or in the plane of, or above the sheeting, or three-dimensional, meaning that they have a length, width, and height. Three-dimensional composite images may appear below or above the sheeting only, or in any combination of below, in the plane of, and above the sheeting, as desired. The term "in the plane of the sheeting" refers only generally to the plane of the sheeting when the sheeting is laid flat. That is, sheeting that isn't flat can also have composite images that appear to be at least in part "in the plane of the sheeting" as that phrase is used herein.

Three-dimensional composite images do not appear at a single focal point, but rather as a composite of images having a continuum of, or discrete focal points, with the focal points ranging from one side of the sheeting to or through the sheeting to a point on the other side. This is preferably achieved by sequentially moving either the sheeting or the radiation source relative to the other (rather than by providing multiple different lenses) so as to modify and/or transfer the material adjacent the material layer at multiple focal points to produce images 46 on surface 6 of material layer 14. The resulting spatially complex image essentially consists of many individual dots. This image can have a spatial extent in any of the three cartesian coordinates relative to the plane of the sheeting.

In another type of effect, a composite image can be made to move into a region of the microlensed sheeting where it disappears. This type of image is fabricated in a fashion analogous to the floating image examples with the addition of placing an opaque mask in front of the microlensed materials to partially block the imaging light for part of the microlensed material. When viewing such an image, the image can be made to move into the region where the imaging light was either reduced or eliminated by the contact mask. The image seems to "disappear" in that region.

In another type of effect, a composite image can be made to change color as viewing angle is changed. This type of image is fabricated in one of several ways, such as blocking an angular portion of the imaging radiation cone for the at least one of a first modified or a first donor. The same virtual image is then re-imaged with at least one of a second modified or a second donor with a different colorant, blocking only the portion of the previously unblocked cone.

Images formed by processes described herein can also be constructed that have a restricted viewing angle. In other words, the image would only be seen if viewed from a particular direction, or minor angular variations of that direction.

Optionally, user interfaces described herein further comprise a partially transmissive reflective film, which are well known in the art. The film can be partially reflective for some or all wavelengths of the visible spectrum. For example, if all wavelengths are substantially equally reflective the film will exhibit a chrome or sliver metallic appearance. Alternatively, if yellow and red light are more strongly reflected than blue light, the film well exhibit a gold or copper metallic appearance. By adjusting the reflectivity of some wavelengths over other wavelengths other colors are possible. This adjustment can be made, for example, by the design of the film and/or by altering the multilayer interference film by adding, for example, a dye or pigment to and/or on a film that reflects all wavelengths.

Exemplary embodiments of partially transmissive reflective films are very thin (i.e., less than 100 nanometers, more typically less than 50 nanometers thick) metallic (e.g., chrome or aluminum) films and multi-layer interference films (see textbooks by e.g., by Macleod (Macleod 2001)). An exemplary embodiment of a multi-layer interference film is a multilayer birefringent polymeric film (see, e.g., U.S. Pat. No. 5,882,774 (Jonza et al.), the disclosure of which is incorporated herein by reference). Embodiments of these films are marketed by 3M Company, St. Paul, Minn., under the trade designation "DBEF".

Tinted (e.g., dyed or pigment) films are well known in the art and are commercially available. Tinted films are available, for example, from 3M Company under the trade designation "SCOTCHCAL 3630" in about 60 different colors. In some embodiments, the reflective colored film may also be used with the tinted film with the latter on the viewer side to achieve a desired color control (e.g., eliminating a color shift on the image while producing a color shifting background).

"Color shifting film" as used herein refers to a film comprising alternating layers of at least a first and second layer type, wherein the first layer type comprises a strain hardening polymer (e.g., a polyester), wherein the film has at least one transmission band and one reflection band in the visible region of the spectrum, the transmission band having an average transmission of at least 70%, and wherein at least one of said transmission band and reflection band varies at normal incidence by less than about 25 nm over a square inch. Optionally, the film comprises alternating polymeric layers of at least a first and a second layer type, wherein the film has at least one transmission band and at least one reflection band in the visible region of the spectrum, and wherein at least one of the transmission band and reflection band has a bandedge that varies at normal incidence by no more than 8 nm over a distance of at least 2 inches along each of two orthogonal axes in the plane of the film. Optionally, at least one of the transmission band and the reflection band has a bandwidth at normal incidence that varies by no more than 2 nm over a surface area of at least 10 cm$^2$. Optionally, the film has exactly one transmission band in the visible region of the spectrum. Optionally, the film has exactly one reflection band in the visible region of the spectrum.

Color shifting films can be made, for example, as described in U.S. Pat. No. 6,531,230 (Weber et al.), the disclosure of which is incorporate herein by reference; additional details regarding such films can also be found in said patent. Embodiments of color shifting films are marketed by 3M Company, St. Paul, Minn., under the trade designation "SCOTCHCAL 3630".

"Light control film" as used herein refers to a film comprising a transparent plastic film having first and second major surfaces, the first major surface having a plurality of grooves, the interiors of the grooves being rendered light absorbing. Suitable light control films are described, for example, in U.S. Pat. No. 4,621,898 (Cohen), U.S. Pat No. 5,204,160 (Rouser), and U.S. Pat No. 6,398,370 (Chiu et al.), the disclosures of which are incorporated herein by reference. Optionally, exemplary embodiments of light control films further comprises cylindrical lenses between adjacent grooves, as well as optionally, the interiors of the grooves are rendered light absorbing by filling the interiors with a light-absorbing material or treating the interiors with a light-absorbing ink.

Films typically have a major surface covered with adhesive. Suitable adhesives are well known in the art (e.g., pressure sensitive adhesives) will generally be found on one surface of the film (continuous or portions depending on the embodiment involved) and allows the film to be attached to another surface.

Some embodiments of light control films comprise a first light transmissive film comprising a first plurality of light absorbing regions extending into a surface thereof; and a second light transmissive film disposed adjacent the first light transmissive film and comprising a second plurality of light absorbing regions extending into a surface thereof, wherein the first plurality of light absorbing regions and the second plurality of light absorbing regions are relatively positioned to allow a viewer to view an image through the light control device within a range of viewing angles and to block viewing of the image through the light control device outside the range of viewing angles. Optionally, the first plurality of light absorbing regions comprises a plurality of grooves. Optionally, the first and second plurality of light absorbing regions each comprises a plurality of grooves.

Hair line films are polymeric film that provides a brushed metal appearance. This appearance is not only visual, but also includes actual texture and brush marks that generally match those of brushed metal. The film also allows light transmission through it so that the display behind the film can be seen by a user/of the user interface. Such films are available, for example, from Kaisei Kogyo Co. Ltd., Tokyo, Japan (e.g., model HSNO.1 (50 micrometer) film).

Suitable light emitting diodes ("LEDs") are known in the art, and commercially available, including LEDs having a light extraction cone in a range from 20° to 30° and LEDs having Lambertian light emission pattern. LEDs are available in a variety of power usage ratings, including those ranging from less than 0.1 to 5 watts (e.g., power usage ratings up to 0.1, 0.25, 0.5, 0.75, 1, 1.25, 1.5, 1.75, or even up to 2 watts) per LED. LEDs are available in colors ranging range from violet (about 410 nm) to deep red (about 700 nm). Basic colors of LEDs are blue, green, red and amber, although other colors, well, as white, are obtainable by mixing the basic colors.

In some embodiments, and typically desirably, the light emitting diodes, when energized have a uniform lumens output. In some embodiments, lighting assemblies described herein have a total power usage of up to 1 watt, 0.75 watt, or even 0.5 watt, wherein lower wattages are typically more desirable for power savings, particularly when the interface is for a motor vehicle. Higher power output may be needed if the user interface is exposed to intense ambient light, for example direct sunlight, which may washout the display.

Suitable switches for user interfaces are known in the art and commercially available. One skilled in the art after reviewing the instant disclosure can select switches suitable for a particular user interface.

Optionally, for user interfaces described herein, the major surface of the sheeting opposite the sensor has at least one of a protective coating, an easy clean coating, an anti-fog coating, or an anti reflective coating on at least a portion of the major surface.

Optionally, the major surface of the sheeting opposite the sensor comprises a protective coating thereon. Protective coatings are known in the art and are used to reduce the scratching and marring of substrates. Exemplary protective coatings may include particles (e.g., nanoparticles) to further increase abrasion resistance. An exemplary protective coating material is hard coat material commercially available from 3M Company, St. Paul, Minn., under the trade designations "3M 906," "3M SCOTCHGARD™ GRAPHIC AND SURFACE PROTECTION FILM 8991," which is a 0.1 mm thick polyester film with a hard coat on the exposed face and a permanent pressure sensitive adhesive for bonding to a substrate.

Optionally, the major surface of the sheeting opposite the sensor comprises a easy clean coating thereon. Easy clean coatings are known in the art and are used to repel oil, dirt, prevent staining and/or absorption of contaminate into the substrate. Exemplary easy clean coating materials include fluorocarbons containing materials or highly crosslinked coatings. An exemplary easy clean/anti graffiti coating material is commercially available from Dow Corning, Midland, Mich., under the trade designation "DOW CORNING 2601."

Optionally, the major surface of the sheeting opposite the sensor comprises an anti-fog coating thereon. Anti-fog coatings are known in the art and are used to reduce or prevent the formation of water droplets which would scatter light and instead spread the water into a film that does not scatter light. Exemplary anti-fog coating materials include nanoparticles in a superhydrophilic binder. Exemplary commercially available anti-fog coating materials include those available from Film Specialties Incorporated, Hillsborough, N.J., under the trade designations "VISGARD" and "VISTEX."

Optionally, the major surface of the sheeting opposite the sensor comprises an anti-reflective coating thereon. Anti-reflective coatings are known in the art and are used to set up destructive interference of reflected light waves from a surface to eliminate reflection. Exemplary anti-reflective constructions use a low index (UV curable) fluoropolymer (e.g., refractive index about 1.4) cross-linkers and high index hard coat (e.g., refractive index about 1.7) on top (e.g., made from Zr metal-oxide crosslinked composite).

Suitable light assembly configurations can be designed and assembled using known techniques by one skilled in the art after reviewing the instant disclosure.

Embodiments of user interfaces described herein are useful, for example, as automobile components (e.g., dashboard components), appliance components (e.g., dishwasher components, stove components, oven components, microwave oven components, clothes washer components, and clothes dyer components), medical equipment, elevator buttons, laboratory equipment (e.g., scales), as well as consumer electronics (e.g., entertainment devices and cell phones), automatic teller machines, and the like.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLE 1

Figure 12:
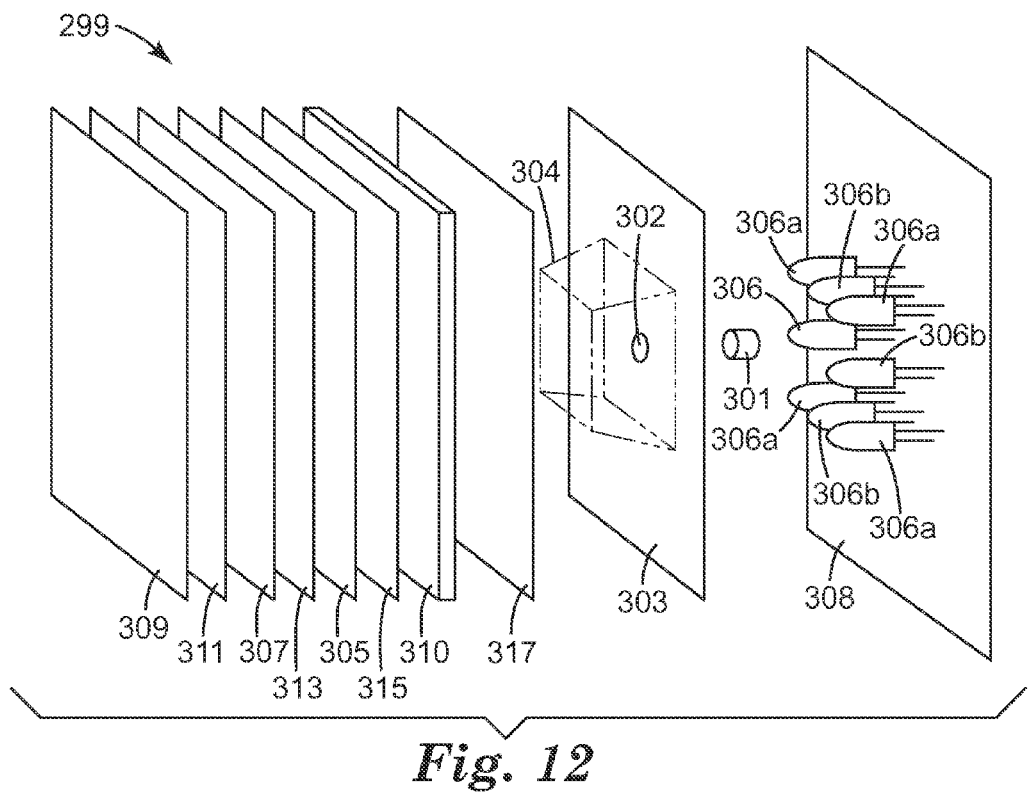
FIG. 12 is a schematic of another exemplary embodiment of a user interface described herein.
Figure 13:
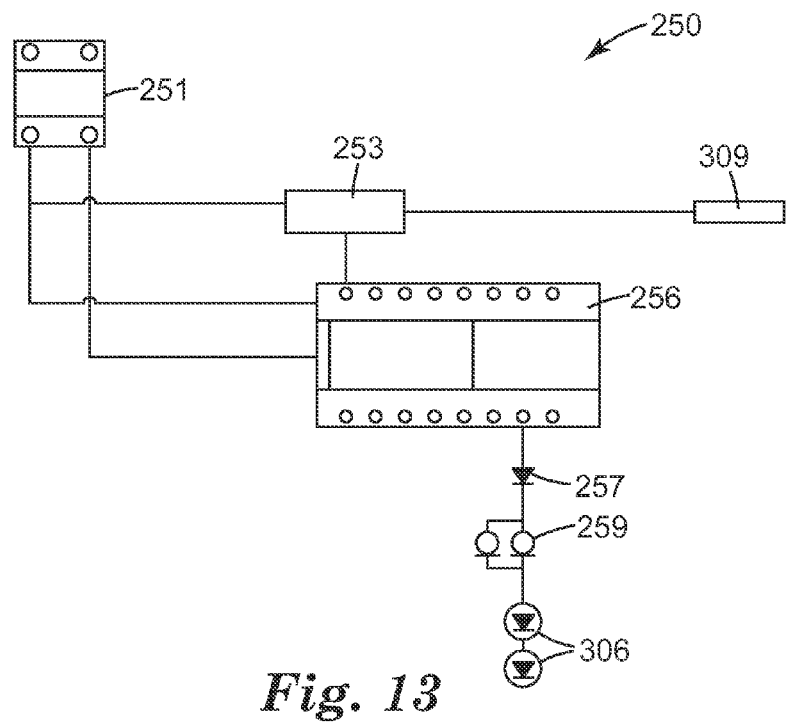
FIG. 13 is a circuit diagram for the user interface shown in FIG. 12.

A user interface as shown in FIGS. 12 and 13 was constructed. A composite of optically clear adhesive films, reflective multilayer optical film, tinted film, film having a brushed hair line appearance (with brushed side toward user), and imaged microlens sheeting was constructed as described below, placed with the imaged reflective sheeting side toward sensor 301 and LEDs 306.

Circuit diagram 250 for user interface 299 had conventional power supply 251 (obtained from Omron Corporation, Kyoto, Japan, under the trade designation "OMRON S8PS-30024C"), sensor amp 253 (obtained from Keyence Corporation, Osaka, Japan, under the trade designation "KEYENCE FS-V21X"), rectifier diode 257 (obtained from Nihon Inter Electronics Corporation, Kanagawa, Japan under the trade designation "10E1") to shunt leak current, and current regulating diode 259 (obtained from Ishizuka Electronics Corporation, Tokyo, Japan under the trade designation "CRDE103") to control the maximum current amperage, programmable logic controller 256 (obtained from Omron Corporation under the trade designation "OMRON 20C2DR-D-V2"), white LEDs 306a and green LEDs 306b (obtained from Nichia Corporation, Tokushima, Japan, under the trade designation "NICHIA NSPW310BS" (white LED) and "NICHIA NSPG310B" (green LED)), and sensor 309 (obtained from Keyence Corporation under the trade designation "KEYENCE FU-22X"). Additional sensor amps (like 253), diodes (like 257), various color LEDs (like 306a and 306b), sensors (like 301), and images (like 304) were also used in parallel, as were additional white LEDs (like 306a) also in series (all not shown) for additional virtual image buttons.

A first optically clear adhesive film (marketed by 3M Company, St. Paul, Minn.) as product number 8171) 315 was applied to a first major surface of an acrylic board (150 mm long, 3 mm thick, and 200 mm wide) 310 using a conventional laminating roll. A first major surface of a reflective multilayer optical film (marketed by 3M Company under the trade designation "Dual Brightness Enhancing Film Q" ("DBEF Q")) 305 was applied to a major surface of the first optically clear adhesive 315 with a conventional laminating roll. A second optically clear adhesive film (marketed by 3M Company, St. Paul, Minn.) 313 was applied to the second major surface of the reflective multilayer optical film using a conventional laminating roll.

A first major surface of a tinted film 307 was applied on a major surface of the second optically clear adhesive film 313 with a conventional laminating roll. Tinted film 307 was made by coating a conventional black UV curable pigmented ink onto a conventional 50 micrometer polyester film.

A third optically clear adhesive film (marketed by 3M Company, St. Paul, Minn.) 311 was applied to the second major surface of the tinted film. A 50 micrometer thick film having a brushed hair line appearance (obtained from Kaisei Kogyo Co. Ltd, Tokyo, Japan as model HSNO.1)) 309 was applied to a major surface of the third optically clear adhesive film 311 with a conventional laminating roll. A fourth optically clear adhesive film 317 was applied to the second major surface of the acrylic board 310 using conventional laminating rolls.

A microlens sheeting (marketed by 3M Company under the trade designation "SCOTCHLIGHT REFLECTIVE SHEETING 680-85") was laser imaged as described in Example 1 of U.S. Pat. No. 6,288,842 (Florczak et al.), the disclosure of which is incorporated herein by reference, except the optical train consisted of a laser (available from Bright Solutions, Cura Carpignano, Italy under the trade designation "WEDGE LASER"), beam expansion telescope, and aspheric lens. The image particular was a button (lateral dimensions of 6 mm by 22 mm). An aperture 302 (1.8 mm) was cut into the center of the imaged button. The imaged reflective sheeting 303 was then applied to the fourth optically clear adhesive film 317 with a conventional laminating roll.

With power supplied to the user interface, the initial settings turned on the white LEDs 306a behind the display, showing the floating images written in the microlens sheeting, especially the white floating image of the button 304. For this user interface, the infrared sensor 301 could detect a change by the presence of the user's finger in the vicinity of the floating image 304 from the difference in amount of light returning through the aperture 302. A first change detected by the sensor 301 would turn off the white LEDs 306a and turn on the green LEDs 306b, thus changing the appearance of the floating image from white to green. A second change detected by the sensor 301 would turn off the green LEDs 306b and turn on the white LEDs 306a, thus changing the appearance of the floating image from green to white. Each change following would alternate between the green and white appearance for the floating image.

EXAMPLE 2

Figure 14:
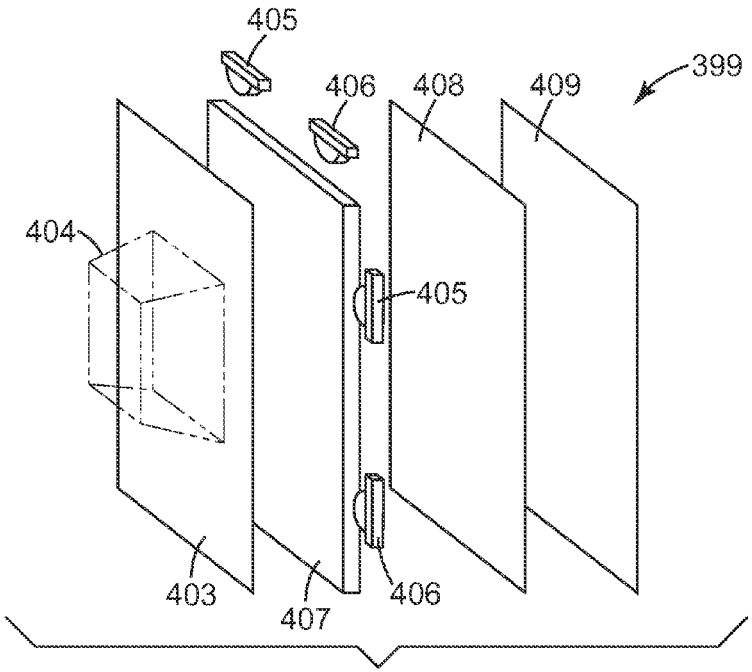
FIG. 14 is a schematic of another exemplary embodiment of a user interface described herein.
Figure 15:
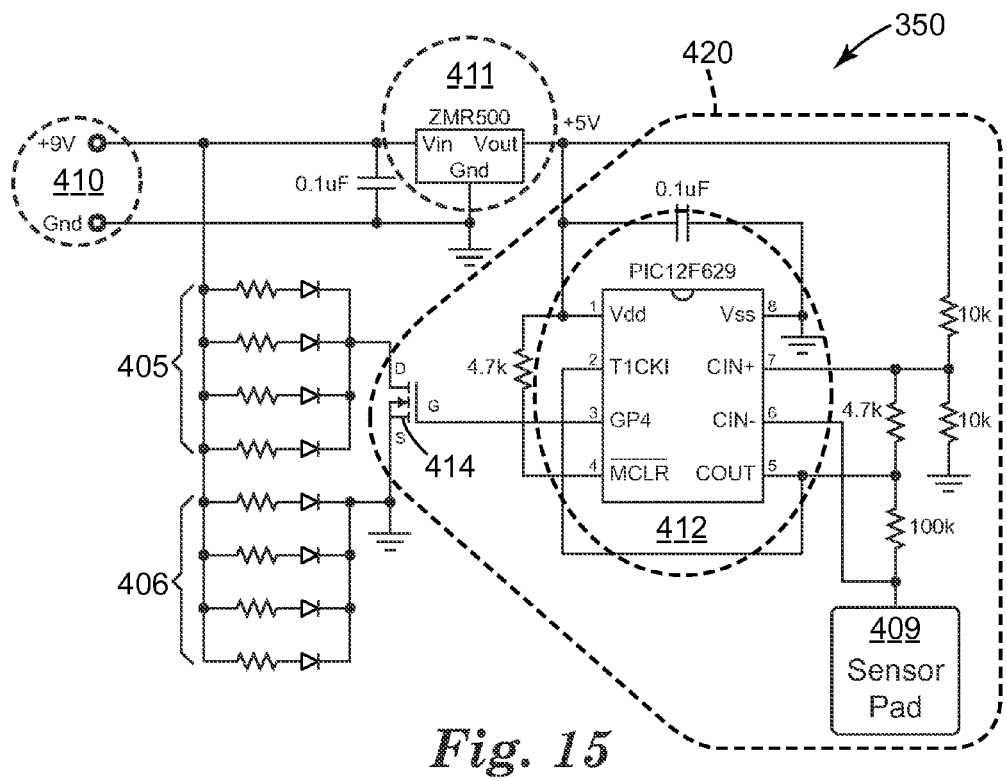
FIG. 15 is a circuit diagram for the user interface shown in FIG. 14.

A user interface 399 as shown in FIGS. 14 and 15 was constructed. A composite of imaged microlens sheeting placed with imaged reflective sheeting 403 side toward acrylic plate 407 and green LEDs 405 and red LEDs 406, clear resin layer 408, and sensor pad 409 was created as described below. This composite was a user interface constructed to detect capacitive changes, such as created by bringing a finger near the sensor area according to the position of image 404 on microlens sheeting 403.

Circuit diagram 350 for user interface 399 utilized a conventional power supply from a 9 volt battery 410 which supplied the power for green LEDs 405 and red LEDs 406, as well as power for the sensor circuit through the 5-volt voltage regulator 411. Sensor circuit 420 included conductive sensor pad 409, complementary metal oxide semiconductor (CMOS) controller 412 (obtained from Microchip Technology, Inc., Chandler, Ariz., under the trade designation "PIC12F629 212"), and metal-oxide-semiconductor field-effect transistor (MOSFET) 414 (obtained from Fairchild, in South Portland, Mass., under the trade designation "2N7002").

Surface mounted, right angle emitting green LEDs 405 and red LEDs 406 (0.1 watt power each obtained from Lumex, Inc., Palantine, Ill., under the trade designation "SML-LXR851SIC-TR" and "SML-LXR851SUGC-TR," respectively), were mounted around the perimeter of clear acrylic plate 407 (20 mm square and 2 mm thickness). LEDs 405, 406 were adhered by a conventional clear silicone resin 408 conformally coated onto sensor pad 409.

A microlens sheeting (marketed by 3M Company under the trade designation "SCOTCHLIGHT REFLECTIVE SHEETING 680-85") was laser imaged as described in Example 1 above, except the image was a different button (lateral dimensions of 17 mm by 17 mm). The imaged microlens sheeting was attached to the surface of the acrylic plate using the adhesive backing of the microlens sheeting ("SCOTCHLIGHT REFLECTIVE SHEETING 680-85"). The imaged features behind the microlenses allowed light from LEDs 405, 406 to pass through imaged microlens sheeting 403 and form images 404 that appeared to be floating above and sinking below the surface of user interface 399.

With power supplied to the user interface, the initial settings turned on green LEDs 405 behind microlens sheeting 403 display, showing floating image 404 written in microlens sheeting 403. Capacitive sensor circuit 350 could detect a change by the presence of a user's finger in the vicinity of floating image 404 from the change in capacitance on sensor pad 409. A first change detected would turn on red LEDs 406, thus changing the appearance of floating image 404 from green to bright orange. A second change detected would turn off red LEDs 406, thus changing the appearance of floating image 404 from bright orange to green. Each change following would alternate between the green and bright orange appearance for floating image 404.

EXAMPLE 3

Figure 16:
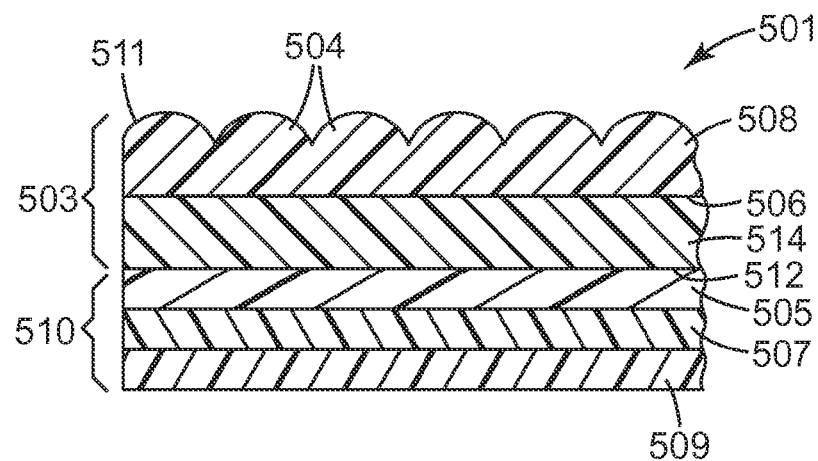
FIG. 16 is an enlarged cross sectional view of a microlens sheeting comprising a plano-convex base sheet.

A user interface was constructed as described for Example 2, except an imaged replicated microlens sheeting 501 with a radiation sensitive layers 510 (collectively 505, 507, and 509) on the substantially planar major surface 512 of microlens sheeting 503 was attached to acrylic plate 407. Referring to FIG. 16, radiation sensitive layer 510 having layers 505, 507, and 509 (described below) was a tuned multilayer optical stack like those reported in U.S. Pat. No. 7,336,422 (Dunn, et al.), the disclosure of which is incorporated here in by reference. This composite is a user interface constructed to detect capacitive changes, such as created by bringing a finger near the sensor area according to the position of image 404 on microlens sheeting 403.

Microlens sheeting 503 had transparent base sheet 508 having first and second broad faces, 511 and 506, and optional base sheet 514 with second broad face 512 was substantially planar. First face 511 had an array of aspherical microlenses 504. The shape of the microlenses and thickness of the base sheet 514, and their variability were selected such that light appropriate for viewing the sheeting was focused approximately at second broad face 512 of microlens sheeting 503.

Radiation sensitive layer 510 was a multilayer optical stack (i.e., layers 505, 507, 509) prepared via vacuum deposition, where the layers were applied to substantially planar side 512 of replicated microlens sheeting 503. First layer (about 5 nm thickness) 505 of chromium metal was applied to major surface 506 vacuum sputtering (see Examples of U.S. Pat. No. 5,877,895 (Shaw, et al.), the disclosure of which is incorporated here in by reference). Second layer 507 (about 400 nm thickness) was applied to first layer 505 via vacuum evaporation and then condensing and polymerizing tripropylene glycol diacrylate with 2% photoinitiator (2-hydroxy-2-methyl-phenyl-propane-1-one) (see Examples of U.S. Pat. No. 5,877,895 (Shaw, et al.), the disclosure of which is incorporated here in by reference). Third layer 509 (about 80 nm) of aluminum metal was applied on second layer 507 via vacuum sputtering (see Examples of U.S. Pat. No. 5,877,895 (Shaw, et al.), the disclosure of which is incorporated here in by reference).

The floating image of another button feature was written into the microlens sheeting as described in FIG. 16 with the same process as described in Example 1. The composite for Example 3 used the imaged replicated microlens sheeting in place of imaged microlens sheeting (403) of Example 2. The imaged microlens sheeting was attached to sensor pad 409 with translucent white double-sided adhesive tape.

Figure 7:
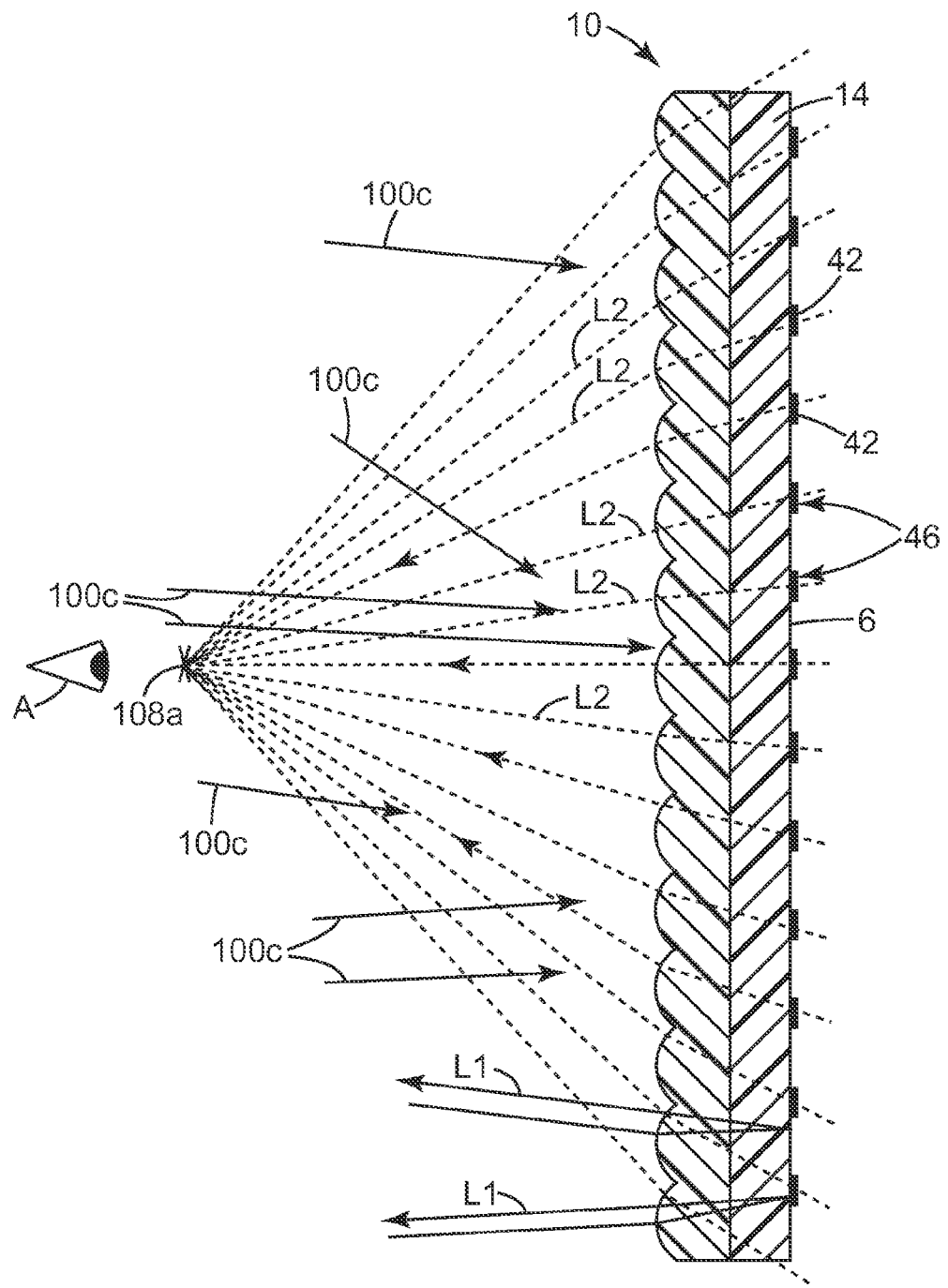
FIG. 7 is a schematic representation of an exemplary sheeting having a composite image that appears to float above the sheeting when the sheeting is viewed in reflected light.

Before the sensor circuit was powered, the image features behind the replicated microlens sheeting could be viewed with ambient, reflected light to have an appearance of a silver-colored floating image, as in the manner of FIG. 7. After the sensor circuit was powered and the green LEDs turned on, the image features behind the replicated microlens sheeting could be viewed with the transmitted light from the green LEDs to have an appearance of a green-colored floating image, as in the manner of FIG. 8. When the sensor detected a change at the sensor pad, for instance a finger in the position of the floating image, the sensor circuit detected a capacitance change and turned on the red LEDs. The light emitted from the combination of green LEDs and red LEDs would change the appearance of the floating image from green to bright orange. A second change detected would turn off the red LEDs 406, thus changing the appearance of the floating image from bright orange to green. Each change following would alternate between the green and bright orange appearance for the floating image. The sensor circuit was then powered off, and the image features behind the replicated microlens sheeting returned in appearance to a silver-colored floating image.

EXAMPLE 4

Example 4 user interface was made as described in Example 3, except imaged replicated microlens sheeting 503 with radiation sensitive layers 510 was replaced by the imaged microlens sheeting described in Example 1 of U.S. Pat. Appl. No. 2007/0081254 (Endle, et al.), the disclosure of which is incorporated herein by reference, except that the optical train consisted of a laser (available from Bright Solutions, Cura Carpignano, Italy under the trade designation "WEDGE LASER"), beam expansion telescope, and aspheric lens. The floating image was cyan-colored, and the imaged microlens sheeting was attached to the sensor pad 409 with translucent white double-sided adhesive tape.

Before the sensor circuit was powered, the image features behind the replicated microlens sheeting could be viewed with ambient, reflected light to have an appearance of a cyan-colored floating image on a diffuse white background, as in the manner of FIG. 7. After the sensor circuit was powered and the green LEDs turned on, the cyan-colored image features behind the replicated microlens sheeting could be viewed on a green background of transmitted light from the green LEDs, as in the manner of FIG. 8. When the sensor detected a change at the sensor pad, for instance a finger in the position of the floating image, the sensor circuit would detected a capacitance changed on turned on the red LEDs. The light emitted from the combination of green LEDs and red LEDs would change the appearance of the floating image background from green to bright orange. A second change detected would turn off the red LEDs 406, thus changing the appearance of the floating image background from bright orange to green. Each change following would alternate between the green and bright orange background appearance for the floating image. The sensor circuit was then powered off, and the image features behind the replicated microlens sheeting returned in appearance to a cyan-colored floating image on a diffuse white background.

EXAMPLE 5

Figures 17, 18:
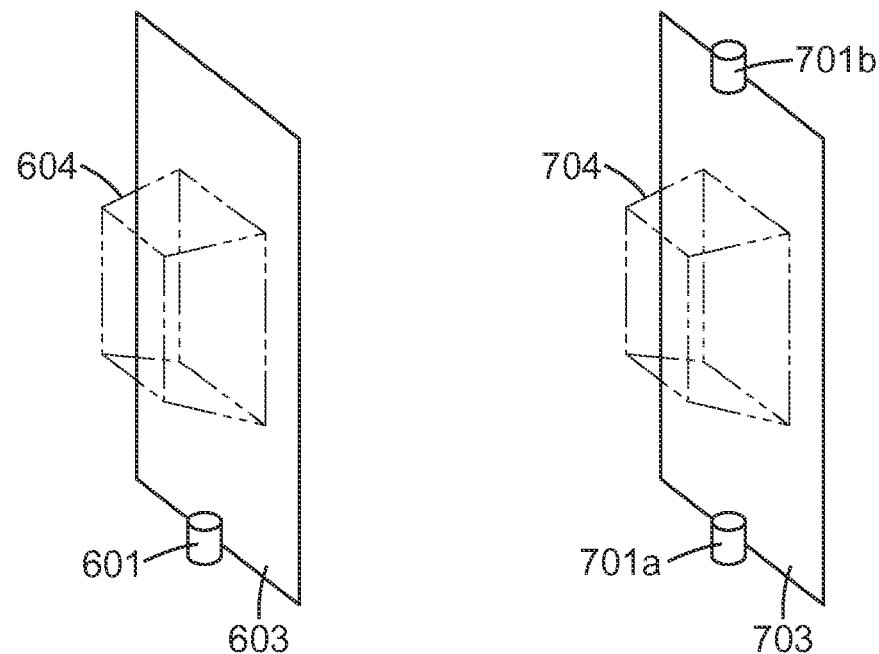
FIG. 17 is a schematic of another exemplary embodiment of a user interface described herein
FIG. 18 is a schematic of another exemplary embodiment of a user interface described herein

Example 5 user interface was made as described in Example 3, except sensor 301, aperture 302, imaged reflective sheeting 303, and button 304 were replaced with the configuration shown in FIG. 17 which had sensor 601, imaged reflective sheeting 603, and button 604 (respectively without an aperture). In this example, the sensing region for sensor 601 was made to coincide with button 604. For this user interface, infrared sensor 601 could detect a change by the user (e.g., the user's finger in the vicinity of the floating image 604) from the difference in amount of light returning to sensor 601.

EXAMPLE 6 (PROPHETIC EXAMPLE)

Example 6 user interface could be made as described for Example 3, except sensor 301, aperture 302, imaged reflective sheeting 303, and button 304 could be replaced with the configuration shown in FIG. 18 which shows infrared transmitting sensor element 701a and receiver sensor element 701b (available, for example, from Keyence Corporation under the trade designation "KEYENCE FU-32"), imaged reflective sheeting 703, and button 704 (respectively without an aperture). Transmitting sensor element 701a could be mounted to align with receiving sensor element 701b so that image 7604 is there between. For this user interface, the infrared transmitting sensor element 701a and receiver sensor element 701b could detect a change by the presence of the user's finger in the vicinity of floating image 704 from the change in amount of light transmitted from transmitting sensor element 701a to receiver sensor element 701b.

Exemplary User Interface Embodiments

1. A user interface comprising:
a sensor;
a sheeting, comprising:
at least one layer of microlenses, the layer having first and second sides;
a layer of material disposed adjacent the first side of the layer of microlenses;
an at least partially complete image formed in the material associated with each of a plurality of the microlenses, wherein the image contrasts with the material; and
a composite image, provided by the individual images, that appears to the unaided eye to be floating at least one of above or below the sheeting,
wherein the sensor and the sheeting are arranged such that when a user interacts with the floating composite image, the sensor is activated.

2. The user interface embodiment 1, wherein the material is a radiation sensitive material.

3. The user interface embodiment 1 or 2, wherein the material is a metallic radiation sensitive material.

4. The user interface embodiment 3, wherein the metallic radiation sensitive material is selected from the group consisting of aluminum, silver, copper, gold, titanium, zinc, tin, chromium, vanadium, tantalum, alloys of these metals, and combinations thereof 5. The user interface embodiment 1, wherein the material is a nonmetallic radiation sensitive material.

6. The user interface embodiment 5, wherein the nonmetallic radiation sensitive material is selected from the group consisting of zinc sulfide, zinc selenide, silicon dioxide, indium tin oxide, zinc oxide, magnesium fluoride, silicon, and combinations thereof 7. The user interface embodiment 1, wherein the material is a radiation sensitive metallic oxide compound.

8. The user interface embodiment 7, wherein the radiation sensitive metallic oxide compound material is selected from the group consisting aluminum oxide compounds, iron oxide compounds, copper oxide compounds, tin oxide compounds, and chromium oxide compounds.

9. The user interface embodiment 1, wherein the material is a thermochromic radiation sensitive material.

10. The user interface embodiment 9, wherein the thermochromic radiation sensitive material is selected from the group consisting of copper carbonate, copper nitrate with thiourea, copper carbonate with sulfur containing compounds of thiols, thioethers, sulfoxides and sulfones, hydrated sulfates, boron nitrides, aluminum nitrides, bismuth nitrides, and combinations thereof.

11. The user interface embodiment 1, wherein the material is a multi-layer thin film radiation sensitive material.

12. The user interface of any one of the preceding embodiments, and further comprising a spacer layer disposed between the material layer and the microlenses.

13. The user interface of any one of the preceding embodiments, wherein the microlenses are selected from the group consisting of plano-convex lenslets, round double convex lenslets, rods, microspheres, beads, cylindrical lenslets, and combinations thereof.

14. The user interface of any one of the preceding embodiments, wherein the composite image is perceptible across a viewing angle of less than one hundred degrees.

15. A user interface comprising:
a sensor;
a sheeting, comprising:
an array of microlenses;
a material layer adjacent the array of microlenses;
at least one of a first modified or a first donor material in contact with the material layer, wherein the at least one of a first modified or a first donor material forms individual, partially complete images on the material layer associated with each of a plurality of the microlenses, wherein the sheeting exhibits a composite image, provided by the individual images, that appears to the unaided eye to at least one of float above or below the sheeting,
wherein the sensor and the sheeting are arranged such that when a user interacts with the floating composite image, the sensor is activated.

16. The user interface embodiment 15, wherein at least part of the composite image at least one of fluoresces or phosphoresces and appears to the unaided eye to float above the sheeting.

17. The user interface embodiment 15, wherein at least part of the composite image at least one of fluoresces or phosphoresces and appears to the unaided eye to float below the sheeting.

18. The user interface embodiment 15, wherein at least part of the composite image at least one of fluoresces or phosphoresces and appears to the unaided eye to float both above and below the sheeting.

19. The user interface of any embodiments 15 to 18, wherein the at least one of a first modified or a first donor material comprises a colorant.

20. The user interface embodiment 19, wherein at least a portion of the composite image exhibits a color similar to the colorant in the at least one of a first modified or a first donor material.

21. The user interface of any embodiments 15 to 20, wherein the at least one of a first modified or a first donor material comprises radiation sensitive material.

22. The user interface of any embodiments 15 to 20, wherein the at least one of a first modified or a first donor material comprises a metallic radiation sensitive material.

23. The user interface of any embodiments 15 to 20, wherein the at least one of a first modified or a first donor material comprises a nonmetallic radiation sensitive material.

24. The user interface of any embodiments 15 to 23, wherein the composite image is perceptible across a viewing angle of less than one hundred fifty degrees.

25. The user interface of any embodiments 15 to 24, wherein the color of the composite image changes relative to a viewing angle of less than one hundred fifty degrees.

26. The user interface of any embodiments 15 to 25, wherein the composite image is a two-dimensional image.

27. The user interface of any embodiments 15 to 25, wherein the composite image is a three-dimensional image.

28. The user interface of any embodiments 15 to 27 further comprising at least one of a second modified or a second donor material adjacent the material layer, wherein the at least one of a second modified or a second donor material forms individual, partially complete images on the sheeting associated with each of a plurality of the microlenses.

29. The user interface embodiment 28, wherein the at least one of a second modified or a second donor material comprises a colorant different from the colorant of the at least one of a first modified or a first donor material.

30. The user interface embodiment 29, wherein at least a portion of the composite image exhibits colors similar to the colorants in the at least one of a first modified or a first donor material and the at least one of a second modified or a second donor material.

31. The user interface embodiment 29, wherein at least a portion of the composite image exhibits a color similar to a mixture of the colorants in the at least one of a first modified or a first donor material and the at least one of a second modified or a second donor material.

32. The user interface embodiment 29, wherein the at least one of a first modified or a first donor material comprises a colorant and provides a first composite image, and wherein the at least one of a second modified or a second donor material provides a second composite image that is at least one of fluoresces or phosphoresces.

33. The user interface of any embodiments 15 to 32 further comprising an adhesive layer for applying the sheeting to a substrate.

34. The user interface embodiment 33, wherein the sheeting is adhered to a substrate.

35. The interface embodiment 15, wherein the composite image also appears to the unaided eye to be at least in part in the plane of the sheeting.

36. The user interface of any one embodiments 1 to 35, wherein the composite image appears under reflected light to float above the sheeting.

37. The user interface of any one embodiments 1 to 35, wherein the composite image appears under reflected light to float below the sheeting.

38. The user interface of any one embodiments 1 to 35, wherein the composite image appears under reflected light to float both above and below the sheeting.

39. The user interface of any one embodiments 1 to 35, wherein the composite image appears in transmitted light to float above the sheeting.

40. The user interface of any one embodiments 1 to 35, wherein the composite image appears in transmitted light to float below the sheeting.

41. The user interface of any one embodiments 1 to 35, wherein the composite image appears under transmitted light to float both above and below the sheeting.

42. The user interface of any one embodiments 1 to 35, wherein the composite image also appears to the unaided eye to be at least in part in the plane of the sheeting.

43. The user interface of any embodiments 1 to 35, wherein the sheeting is an exposed lens sheeting.

44. The s user interface of any embodiments 1 to 35, wherein the sheeting is an embedded lens sheeting.

45. The user interface of any embodiments 1 to 35, wherein the composite image appears to move relative to the sheeting as the viewing position changes relative to the sheeting.

46. The user interface of any embodiments 1 to 35, wherein the composite image disappears and reappears when the angle at which the sheeting is viewed changes.

47. The user interface of any embodiments 1 to 35, wherein the sheeting comprises more than one composite image.

48. The user interface of any embodiments 1 to 35, wherein the sensor is an infrared sensor, and wherein the sheet has an opening therein for detection through the sheet by the infrared sensor.

49. The user interface of any embodiments 1 to 35, wherein the sensor is a capacitive sensor.

50. The user interface of any embodiments 1 to 49, further comprising a partially transmissive reflective film, wherein the sensor, the sheeting, and the film are positioned sequentially in said order.

51. The user interface of any embodiments 1 to 49, further comprising:
a tinted film; and
a partially transmissive reflective film,
wherein the sensor, the sheeting, the tinted film, and the partially transmissive reflective film a are positioned sequentially in said order.

52. The user interface of any embodiments 1 to 49, further comprising:
a color shifting film; and
a partially transmissive reflective film,
wherein the sensor, the sheeting, the color shifting film, and the partially transmissive reflective film are positioned sequentially in said order.

53. The user interface of any embodiments 1 to 49, further comprising:
a tinted film;
a partially transmissive reflective film; and
a light control film,
wherein the sensor, the sheeting, the tinted film, the partially transmissive reflective film, and the light control film are positioned sequentially in said order.

54. The user interface of any embodiments 1 to 49, further comprising:
a color shifting film;
a partially transmissive reflective film; and
a light control film,
wherein the sensor, the sheeting, the color shifting film, the partially transmissive reflective film, and the light control film are positioned sequentially in said order.

55. The user interface of any embodiments 1 to 54, further comprising a switch for activating a device to an on mode.

56. The user interface of any embodiments 1 to 54, further comprising a switch for activating a device to an off mode.

57. The user interface of any embodiments 1 to 54, further comprising a switch for activating a device from both an on and an off mode.

58. The user interface of any embodiments 1 to 57, further comprising a light source, wherein the light source, the sensor, and the sheeting are positioned sequentially in said order.

59. The user interface embodiment 58, wherein the light source includes a light emitting diode.

60. The user interface of any embodiments 1 to 59, wherein the sheeting has a major surface opposite the sensor comprising a protective coating on at least a portion of the major surface.

61. The user interface of any embodiments 1 to 60, wherein the sheeting has a major surface opposite the sensor comprising an easy clean coating on at least a portion of the major surface.

62. The user interface of any embodiments 1 to 61, wherein the sheeting has a major surface opposite the sensor comprising an anti-fog coating on at least a portion of the major surface.

63. The user interface of any embodiments 1 to 62, wherein the sheeting has a major surface opposite the sensor comprising an anti reflective coating on at least a portion of the major surface.

64. The user interface of any embodiments 1 to 63 that is an automobile component.

65. The user interface of any embodiments 1 to 64 that is an automobile dashboard component.

66. The user interface of any embodiments 1 to 63 that is an appliance component.

67. The user interface of any embodiments 1 to 63 that is a dishwasher component.

68. The user interface of any embodiments 1 to 63 that is a stove component.

69. The user interface of any embodiments 1 to 63 that is an oven component.

70. The user interface of any embodiments 1 to 63 that is a microwave oven component.

71. The user interface of any embodiments 1 to 63 that is a clothes washer component.

72. The user interface of any embodiments 1 to 63 that is a clothes dyer component.

73. The user interface of any embodiments 1 to 63 that is a consumer electronic component.

Various modifications and combinations of the embodiments disclosed will be apparent to those skilled in the art, and those modifications are intended to be within the scope of the invention as defined in the appended claims.

What is claimed is:

1. A user interface comprising:
   an infrared sensor;
   a sheeting, comprising:
      at least one layer of microlenses, the layer having first and second sides;
      a layer of material disposed adjacent the first side of the layer of microlenses;
      an at least partially complete image formed in the material associated with each of a plurality of the microlenses, wherein each image contrasts with the material;
      an opening on the sheeting aligned with the infrared sensor; and
      a composite image, provided by the individual images, that appears to the unaided eye to be floating at least one of above or below the sheeting,
   wherein the infrared sensor and the sheeting are arranged such that when a user interacts with the floating composite image, the infrared sensor detects the interaction through the opening and generates a sensor signal.

2. The user interface of claim 1, wherein the material is a radiation sensitive material.

3. The user interface of claim 1, and further comprising a spacer layer disposed between the material layer and the microlenses.

4. The user interface of claim 1, wherein the composite image is perceptible across a viewing angle of less than one hundred degrees.

5. A user interface comprising:
   an infrared sensor;
   a sheeting, comprising:
      an array of microlenses;
      a material layer adjacent the array of microlenses;
      an opening aligned with the infrared sensor;
      at least one of a first modified or a first donor material in contact with the material layer, wherein the at least one of a first modified or a first donor material forms individual, partially complete images on the material layer associated with each of a plurality of the microlenses, wherein the sheeting exhibits a composite image, provided by the individual images, that appears to the unaided eye to at least one of float above or below the sheeting,
   wherein the infrared sensor and the sheeting are arranged such that when a user interacts with the floating composite image, the infrared sensor detects the interaction through the opening and generates a sensor signal.

6. The user interface of claim 5, wherein at least part of the composite image is at least one of fluoresces or phosphoresces and appears to the unaided eye to float above the sheeting, below the sheeting, or both above and below the sheeting.

7. The user interface of claim 5, wherein the at least one of a first modified or a first donor material comprises radiation sensitive material.

8. The user interface of claim 5, wherein the color of the composite image changes relative to a viewing angle of less than one hundred fifty degrees.

9. The user interface of claim 5 further comprising at least one of a second modified or a second donor material adjacent the material layer, wherein the at least one of a second modified or a second donor material forms individual, partially complete images on the sheeting associated with each of a plurality of the microlenses.

10. The user interface of claim 1, further comprising a partially transmissive reflective film, wherein the sensor, the sheeting, and the film are positioned sequentially in said order.

11. The user interface of claim 1, further comprising:
   a tinted film or a color shifting film; and
   a partially transmissive reflective film,
   wherein the sensor, the sheeting, the tinted film or color shifting film, and the partially transmissive reflective film a are positioned sequentially in said order.

12. The user interface of claim 1, further comprising:
   a tinted film or a color shifting film;
   a partially transmissive reflective film; and
   a light control film,
   wherein the sensor, the sheeting, the tinted film or color shifting film, the partially transmissive reflective film, and the light control film are positioned sequentially in said order.

13. The user interface of claim 1, further comprising a light source, wherein the light source, the sensor, and the sheeting are positioned sequentially in said order.

14. The user interface of claim 1, wherein the sheeting has a major surface opposite the sensor comprising a protective coating, an easy clean coating, an anti-fog coating, or an anti reflective coating on at least a portion of the major surface.

15. The user interface of claim 5, further comprising a partially transmissive reflective film, wherein the sensor, the sheeting, and the film are positioned sequentially in said order.

16. The user interface of claim 5, further comprising:
   a tinted film or a color shifting film; and
   a partially transmissive reflective film,
   wherein the sensor, the sheeting, the tinted film or color shifting film, and the partially transmissive reflective film a are positioned sequentially in said order.

17. The user interface of claim 5, further comprising:
   a tinted film or a color shifting film;
   a partially transmissive reflective film; and
   a light control film,
   wherein the sensor, the sheeting, the tinted film or color shifting film, the partially transmissive reflective film, and the light control film are positioned sequentially in said order.

18. The user interface of claim 5, further comprising a light source, wherein the light source, the sensor, and the sheeting are positioned sequentially in said order.

* * * * *